United States Patent
Ohkura et al.

(10) Patent No.: US 8,742,619 B2
(45) Date of Patent: Jun. 3, 2014

(54) BATTERY SYSTEM, ELECTRIC VEHICLE, MOVABLE BODY, POWER STORAGE DEVICE, AND POWER SUPPLY DEVICE

(75) Inventors: Kazumi Ohkura, Nara (JP); Tomonori Kunimitsu, Himeji (JP)

(73) Assignee: SANYO Electric Co., Ltd., Moriguchi-Shi (JP)

( * ) Notice: Subject to any disclaimer, the term of this patent is extended or adjusted under 35 U.S.C. 154(b) by 182 days.

(21) Appl. No.: 13/517,982

(22) PCT Filed: Sep. 13, 2011

(86) PCT No.: PCT/JP2011/005148
§ 371 (c)(1),
(2), (4) Date: Jul. 27, 2012

(87) PCT Pub. No.: WO2012/131808
PCT Pub. Date: Oct. 4, 2012

(65) Prior Publication Data
US 2012/0280573 A1 Nov. 8, 2012

(30) Foreign Application Priority Data
Mar. 25, 2011 (JP) .................................. 2011-068084

(51) Int. Cl.
*H02J 1/10* (2006.01)
(52) U.S. Cl.
USPC ............................. 307/43; 307/10.1; 320/134
(58) Field of Classification Search
USPC ............. 307/80, 10.1, 43; 320/118, 116, 134; 180/65.29
See application file for complete search history.

(56) References Cited

U.S. PATENT DOCUMENTS

| 7,014,001 | B2 * | 3/2006 | Beckerman et al. | 180/65.1 |
| 7,474,015 | B2 * | 1/2009 | Enders et al. | 307/10.1 |
| 8,212,571 | B2 * | 7/2012 | Emori et al. | 324/522 |
| 8,288,997 | B2 * | 10/2012 | Choi et al. | 320/132 |

(Continued)

FOREIGN PATENT DOCUMENTS

| GB | 2 453 207 A | 1/2003 |
| JP | 2003-079059 A | 3/2003 |

(Continued)

OTHER PUBLICATIONS

English Translation of International Search Report for corresponding International Patent Application No. PCT/JP2011/005148, dated Dec. 13, 2011.*

(Continued)

*Primary Examiner* — Daniel Cavallari
(74) *Attorney, Agent, or Firm* — NDQ&M Watchstone LLP

(57) ABSTRACT

One state detector detects an abnormal state or a normal state relating to charge and discharge of a battery cell group in one battery module, and generates one detection signal representing the detected state. Another state detector detects an abnormal state or a normal state relating to charge and discharge of another battery cell group in another battery module, and generates another detection signal representing the detected state. One operation processing device sends the one detection signal generated by the one state detector to an external object. Another operation processing device sends the other detection signal generated by the other state detector to the external object. The one detection signal generated by the one state detector is transmitted to at least one of the other operation processing device and the other state detector via a signal line.

13 Claims, 17 Drawing Sheets

(56) References Cited

U.S. PATENT DOCUMENTS

| | | |
|---|---|---|
| 2010/0259221 A1 | 10/2010 | Tabatowski-Bush |
| 2011/0037432 A1 | 2/2011 | Sakurai et al. |
| 2011/0089760 A1* | 4/2011 | Castelaz et al. ............... 307/25 |
| 2011/0101920 A1* | 5/2011 | Seo et al. ..................... 320/127 |
| 2013/0049698 A1* | 2/2013 | Jung .............................. 320/134 |
| 2013/0271072 A1* | 10/2013 | Lee et al. ..................... 320/108 |

FOREIGN PATENT DOCUMENTS

| | | |
|---|---|---|
| JP | 2005-261193 A | 9/2005 |
| JP | 2009-100644 A | 5/2009 |
| JP | 2010-246372 A | 10/2010 |
| KR | 10-2010-0029118 A | 3/2010 |
| KR | 10-2011-0015880 A | 2/2011 |

OTHER PUBLICATIONS

International Search Report for corresponding International Patent Application No. PCT/JP2011/005148, dated Dec. 13, 2011.
English Abstract for JP 2003-079059 A, published Mar. 3, 2003.
English Abstract for JP 2009-100644 A, published May 7, 2009.
English Abstract for JP 2005-261193 A, published Sep. 22, 2005.
English Abstract for JP 2010-246372 A, published Oct. 28, 2010.
Korean Office Action issued Jun. 13, 2012 in corresponding Korean application No. 10-2012-7006229.
English Abstract for KR 10-2011-0015880 A, published Feb. 17, 2011.

* cited by examiner

BATTERY SYSTEM, ELECTRIC VEHICLE, MOVABLE BODY, POWER STORAGE DEVICE, AND POWER SUPPLY DEVICE

CROSS REFERENCE TO RELATED APPLICATIONS

This application is the national stage of International Application No. PCT/JP2011/005148, filed Sep. 13, 2011, which application claims priority to Japanese Patent Application No. 2011-068084, filed Mar. 25, 2011. All of the above-identified applications are incorporated herein by reference in their entireties.

TECHNICAL FIELD

The present invention relates to a battery system, and an electric vehicle, a movable body, a power storage device, and a power supply device including the same.

BACKGROUND ART

In battery systems used as driving sources for movable bodies such as electric automobiles or electric storage devices, a plurality of battery modules, which can be charged and discharged, are provided. Each of the battery modules has a configuration in which a plurality of batteries (battery cells) are connected in series, for example. The battery systems are provided with detection devices that detect abnormalities such as overcharge or overdischarge of the battery cells.

In an in-vehicle assembled battery control device discussed in Patent Document 1, a plurality of simplified cell overcharge/overdischarge detection devices are provided to correspond to a plurality of cell groups constituting an assembled battery. Each of the simplified cell overcharge/overdischarge detection devices determines whether a battery cell in the corresponding cell group is overcharged or overdischarged, and sends its result to a battery controller.

[Patent Document 1] JP 2003-79059 A

SUMMARY OF INVENTION

In the in-vehicle assembled battery control device discussed in Patent Document 1, the battery controller detects the overcharge or overdischarge of the battery cell in the cell group. If a defect has occurred in a communication path including a CPU (Central Processing Unit) or an IC (Integrated Circuit) between the simplified cell overcharge/overdischarge detection device and the battery controller, however, a determination result of the overcharge or overdischarge of the battery cell cannot be sent to the battery controller. In this case, the overcharge or overdischarge of the battery cell cannot be stopped. This results in decreased reliability of the simplified cell overcharge/overdischarge detection device.

An object of the present invention is to provide a battery system the reliability of which can be improved while an increase in cost is suppressed, and an electric vehicle, a movable body, a power storage device, and a power supply device including the same.

A battery system according to the present invention includes a first battery module, a second battery module, and a first communication path, in which the first battery module includes a first battery cell group including one or a plurality of battery cells, a first state detector that detects an abnormal state or a normal state relating to charge and discharge of the first battery cell group, and generates a first detection signal representing the detected state, and a first communication circuit that sends the first detection signal generated by the first state detector to an external object, the second battery module includes a second battery cell group including one or a plurality of battery cells, a second state detector that detects an abnormal state or a normal state relating to charge and discharge of the second battery cell group, and generates a second detection signal representing the detected state, and a second communication circuit that sends the second detection signal generated by the second state detector to the external object, and the first communication path is provided to transmit the first detection signal generated by the first state detector to at least one of the second communication circuit and the second state detector.

According to the present invention, the reliabilities of a battery system, and an electric vehicle, a movable body, a power storage device, and a power supply device including the same are improved while an increase in cost is suppressed.

DESCRIPTION OF EMBODIMENTS

[1] First Embodiment

A battery system according to a first embodiment will be described with reference to the drawings. The battery system according to the present embodiment is loaded in an electric vehicle (e.g. an electric automobile) using electric power as a driving source. The battery system can also be used for an electric storage device or consumer equipment including a plurality of battery cells that can be charged and discharged.

(1) Configuration of Battery System

Figure 1:
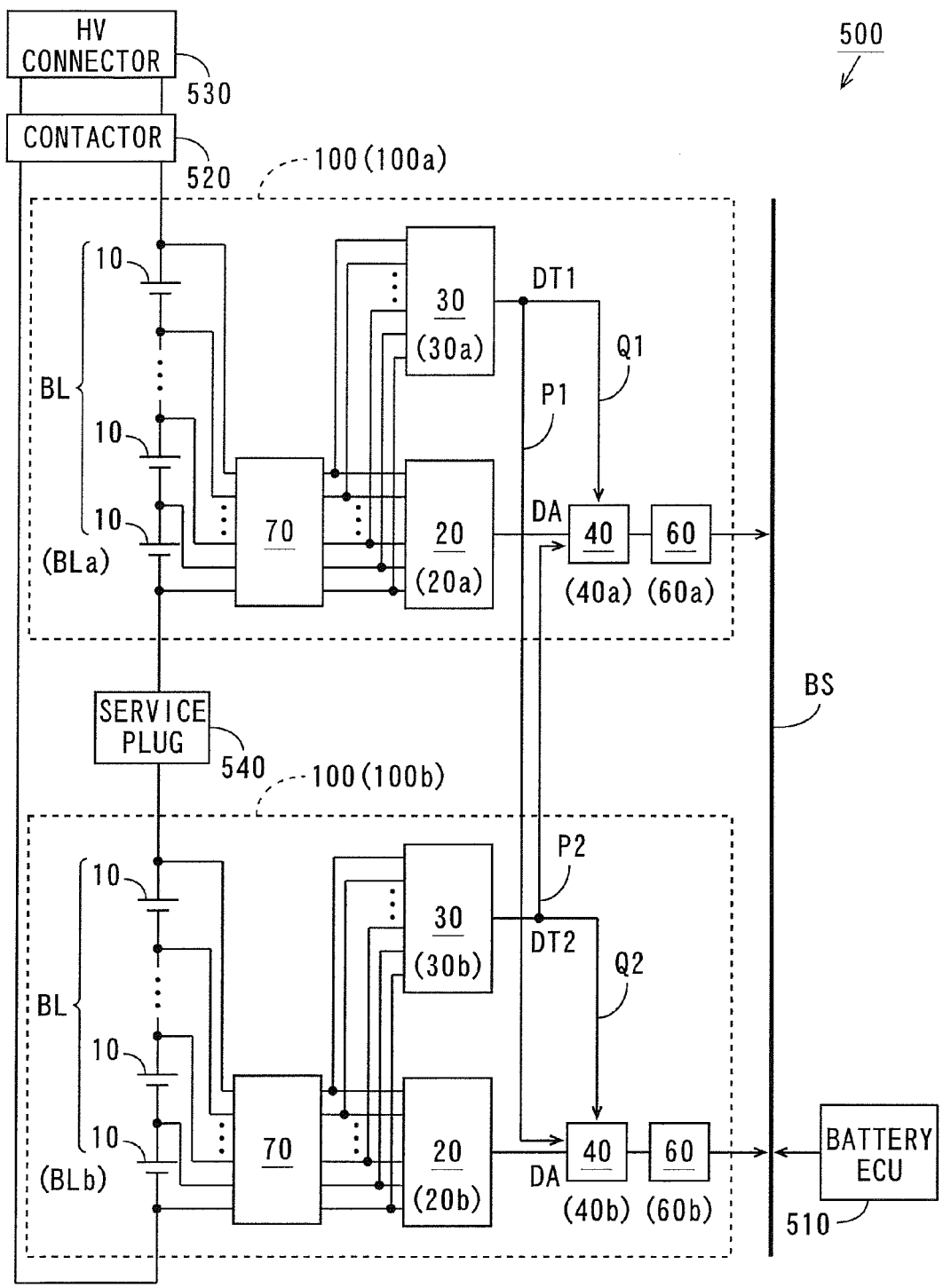
FIG. 1 is a block diagram illustrating a configuration of a battery system according to a first embodiment.

FIG. 1 is a block diagram illustrating a configuration of the battery system according to the first embodiment. As illustrated in FIG. 1, a battery system 500 includes a plurality of battery modules 100, a battery ECU (Electronic Control Unit) 510, a contactor 520, an HV (High Voltage) connector 530, and a service plug 540. In the present embodiment, the battery system 500 includes two battery modules 100. In the following description, the two battery modules 100 are respectively referred to as battery modules 100a and 100b.

Each of the battery modules 100a and 100b includes a battery cell group BL including a plurality of battery cells 10, a voltage detector 20, a state detector 30, an operation processing device 40, a communication driver 60, and a cell-voltage-balancing circuit 70. The plurality of battery cells 10 in the battery cell group BL are connected in series. The battery cell groups BL are arranged adjacent to each other while being integrally held as a battery block. A plurality of thermistors TH (see FIG. 9, described below) for detecting a temperature is attached to the battery cell group BL. Each of the battery cells 10 is a secondary battery such as a lithium-ion battery or a nickel hydride battery.

The respective battery cell groups BL in the plurality of battery modules 100a and 100b are connected in series via a power supply line and the service plug 540. The service plug 540 includes a switch for electrically connecting or disconnecting the battery modules 100a and 100b. The switch in the service plug 540 is turned on so that all the battery cells 10 in the plurality of battery modules 100a and 100b are connected in series. At the time of maintenance of the battery system 500, for example, the switch in the service plug 540 is turned off. In this case, no current flows in the battery modules 100a and 100b. This can prevent a user from getting an electric shock even if he/she contacts the battery modules 100a and 100b.

First, an operation of each unit in the battery module 100a will be described. The voltage detector 20 detects a terminal voltage of each of the plurality of battery cells 10, and feeds a detection signal DA representing a value of the detected terminal voltage to the operation processing device 40.

The state detector 30 detects the presence or absence of an abnormality in the terminal voltage of each of the plurality of battery cells 10 as an abnormality relating to charge and discharge of the corresponding battery cell group BL, and generates a detection signal DT1 representing its detection result. The detection signal DT1 generated by the state detector 30 in the battery module 100a is fed to the corresponding operation processing device 40 via a connection line Q1 while being fed to the operation processing device 40 in the battery module 100b via a signal line P1. In order to prevent each of the battery cells 10 from being overdischarged and overcharged, an allowable voltage range of the terminal voltage is defined. In the present embodiment, the state detector 30 detects whether the terminal voltage of each of the battery cells 10 is an upper limit of the allowable voltage range (hereinafter referred to as an upper-limit voltage) or more while detecting whether the terminal voltage is a lower limit of the allowable voltage range (hereinafter referred to as a lower-limit voltage) or less.

The state detector 30 generates an "H"-level detection signal DT1, for example, representing an abnormality if the terminal voltage of at least one of the battery cells 10 in the corresponding battery cell group BL is the upper-limit voltage or more or is the lower-limit voltage or less (at the time of abnormality detection). The state detector 30 generates an "L"-level detection signal DT1, for example, representing a normality if the terminal voltages of all the battery cells 10 in the corresponding battery cell group BL are within the allowable voltage range (at the time of normality detection).

The operation processing device 40 includes a CPU and a memory, or a microcomputer, for example. The operation processing device 40 performs CAN (Controller Area Network) communication, for example, via the communication driver 60. Thus, the operation processing device 40 sends the detection signal DT1 fed by the corresponding state detector 30 and a detection signal DT2, described below, fed by the state detector 30 in the battery module 100b to the battery ECU 510 via the communication driver 60 and a bus BS. The operation processing device 40 sends a value of the terminal voltage of each of the plurality of battery cells 10 to the battery ECU 510 via the communication driver 60 and the bus BS based on the detection signal DA fed from the voltage detector 20. Further, the operation processing device 40 sends a value of a temperature of the battery module 100a, which is given from the thermistors TH illustrated in FIG. 9, described below, to the battery ECU 510 via the communication driver 60 and the bus BS.

The operation processing device 40 performs various types of arithmetic processing and determination processing using the value of the terminal voltage of each of the plurality of battery cells 10 and the value of the temperature. Further, the operation processing device 40 receives various types of command signals from the battery ECU 510 via the bus BS and the communication driver 60.

Controlled by the operation processing device 40, the cell-voltage-balancing circuit 70 performs equalization processing for equalizing the terminal voltage of each of the plurality of battery cells 10 in the battery cell group BL.

A configuration and an operation of the battery module 100b are similar to those of the battery module 100a except for the following points.

The state detector 30 in the battery module 100b detects the presence or absence of an abnormality in the terminal voltage of each of the plurality of battery cells 10 as an abnormality relating to charge and discharge of the corresponding battery cell group BL, and generates a detection signal DT2 representing its detection result. The detection signal DT2 generated by the state detector 30 in the battery module 100b is fed to the corresponding operation processing device 40 via a connection line Q2 while being fed to the operation processing device 40 in the battery module 100a via a signal line P2.

The state detector 30 generates an "H"-level detection signal DT2, for example, representing an abnormality if the terminal voltage of at least one of the battery cells 10 in the corresponding battery cell group BL is the upper-limit voltage or more or is the lower-limit voltage or less (at the time of abnormality detection). The state detector 30 generates an "L"-level detection signal DT2, for example, representing a normality if the terminal voltages of all the battery cells 10 in the corresponding battery cell group BL are within the allowable voltage range (at the time of normality detection).

The operation processing device 40 in the battery module 100b sends the detection signal DT2 fed by the corresponding state detector 30 and the detection signal DT1 fed by the state detector 30 in the battery module 100a to the battery ECU 510 via the communication driver 60 and the bus BS. The operation processing device 40 sends a value of a temperature of the battery module 100b, which is given from the thermistors TH illustrated in FIG. 9, described below, to the battery ECU 510 via the communication driver 60 and the bus BS.

Based on the value of the terminal voltage of each of the plurality of battery cells 10, which has been given from the operation processing device 40 in each of the battery modules 100a and 100b, the battery ECU 510 calculates an SOC of the battery cell 10. Based on the value of the terminal voltage of each of the plurality of battery cells 10, which has been given from the operation processing device 40 in each of the battery modules 100a and 100b, the battery ECU 510 determines the presence or absence of an abnormality relating to charge and discharge of the battery cell group BL in the battery module. The abnormality relating to charge and discharge of the battery cell group BL in each of the battery modules 100a and 100b includes an abnormality in a current flowing in the battery cell group BL, a terminal voltage of the battery cell 10, an SOC (State of Charge), overdischarge, overcharge, or a temperature.

Further, based on the detection signals DT1 and DT2 respectively fed from the operation processing devices 40 in the battery modules 100a and 100b, the battery ECU 510 detects the presence or absence of an abnormality in the terminal voltage of each of the plurality of battery cells 10 in each of the battery modules 100a and 100b.

A power supply line connected to a positive electrode having the highest potential of the battery module 100a and a power supply line connected to a negative electrode having the lowest potential of the battery module 100b are connected to the contactor 520. The contactor 520 is connected to a load (e.g. a motor) for an electric vehicle, for example, via the HV connector 530. If an abnormality occurs in each of the battery modules 100a and 100b, the battery ECU 510 turns off the contactor 520. This prevents the battery modules 100a and 100b from generating abnormal heat because no current flows through the plurality of battery cells 10 when an abnormality occurs.

The battery ECU 510 is connected to a main controller 300 (see FIG. 10, described below) in an electric vehicle via a bus. An SOC of each of the battery modules 100a and 100b (an SOC of the battery cell 10) is given to the main controller 300 from the battery ECU 510. The main controller 300 controls power of the electric vehicle (e.g., a rotational speed of the motor) based on the SOC. When the SOC of each of the battery modules 100a and 100b is reduced, the main controller 300 controls a power generation device, which is not illustrated, connected to the power supply line, to charge each of the battery modules 100a and 100b.

(2) Configuration of Voltage Detector and State Detector

Figure 2:
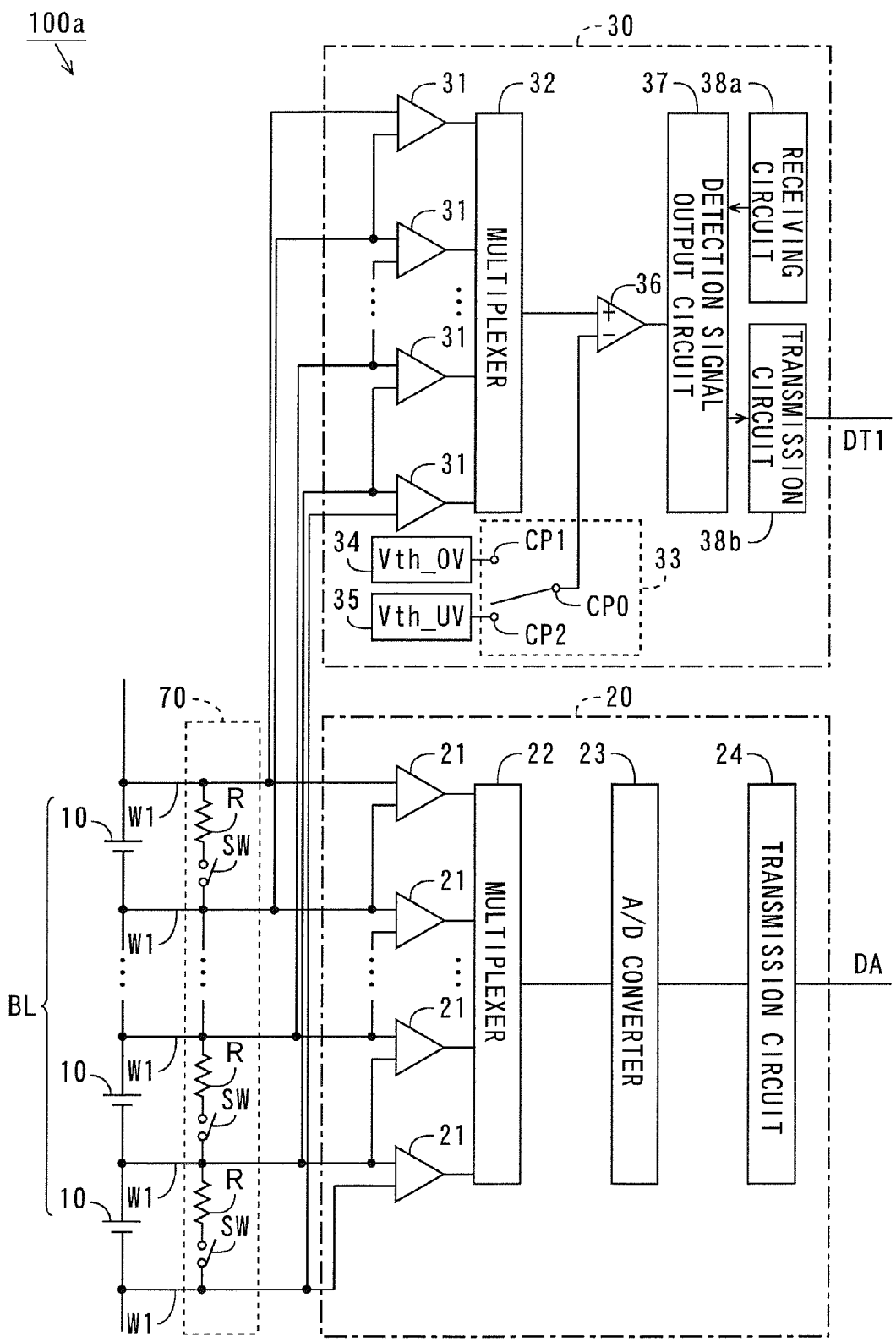
FIG. 2 is a block diagram illustrating a configuration of a voltage detector, a state detector, and a cell-voltage-balancing circuit in a battery module.

FIG. 2 is a block diagram illustrating a configuration of the voltage detector 20, the state detector 30, and the cell-voltage-balancing circuit 70 in the battery module 100a.

The voltage detector 20 includes an ASIC (Application Specific Integrated Circuit), for example. The voltage detector 20 includes a plurality of differential amplifiers 21, a multiplexer 22, an ND (Analog/Digital) converter 23, and a transmission circuit 24.

Each of the differential amplifiers 21 has two input terminals and an output terminal. Each of the differential amplifiers 21 differentially amplifies voltages respectively input to the two input terminals, and outputs the amplified voltages from the output terminal. The two input terminals of each of the differential amplifiers 21 are respectively connected to a positive electrode and a negative electrode of the corresponding battery cell 10 via conductor lines W1. Thus, the differential amplifier 21 differentially amplifies a voltage between the positive electrode and the negative electrode of the battery cell 10. An output voltage of each of the differential amplifiers 21 corresponds to the terminal voltage of the corresponding battery cell 10. The terminal voltages output from the plurality of differential amplifiers 21 are fed to the multiplexer 22. The multiplexer 22 sequentially outputs the terminal voltages fed from the plurality of differential amplifiers 21 to the A/D converter 23.

The A/D converter 23 converts the terminal voltage output from the multiplexer 22 to a digital value. The digital value obtained by the A/D converter 23 is given, as a detection signal DA representing a value of the terminal voltage, to the operation processing device 40 (see FIG. 1) via the transmission circuit 24.

The state detector 30 includes an ASIC, for example. The state detector 30 includes a plurality of differential amplifiers 31, a multiplexer 32, a switch circuit 33, reference voltage outputters 34 and 35, a comparator 36, a detection signal output circuit 37, a receiving circuit 38a, and a transmission circuit 38b.

Each of the differential amplifiers 31 has two input terminals and an output terminal. Each of the differential amplifiers 31 differentially amplifies voltages respectively input to the two input terminals, and outputs the amplified voltages from the output terminal. The two input terminals of each of the differential amplifiers 31 are respectively connected to a positive electrode and a negative electrode of the corresponding battery cell 10 by conductor lines W1. Thus, the differential amplifier 31 differentially amplifies a voltage between the positive electrode and the negative electrode of the battery cell 10. An output voltage of each of the differential amplifiers 31 corresponds to a terminal voltage of the corresponding battery cell 10. The terminal voltages output from the plurality of differential amplifiers 31 are fed to the multiplexer 32. The multiplexer 32 sequentially outputs the terminal voltages fed from the plurality of differential amplifiers 31 to the comparator 36.

The switch circuit 33 has terminals CP0, CP1, and CP2. The reference voltage outputter 34 outputs an upper-limit voltage Vth_O to the terminal CP1 of the switch circuit 33. The reference voltage outputter 35 outputs a lower-limit voltage Vth_U to the output terminal CP2. The upper-limit voltage Vth_O is set to 4.2 V (not less than 4.19 V and not more than 4.21 V), for example, and the lower-limit voltage Vth_U is set to approximately 2.0 V (not less than 1.99 V and not more than 2.01 V), for example.

The comparator 36 has two input terminals and an output terminal. One of the two input terminals of the comparator 36 is connected to the multiplexer 32. The other input terminal of the comparator 36 is connected to the terminal CP0 of the switch circuit 33. The switch circuit 33 is switched so that the terminal CP0 is alternately connected to the plurality of terminals CP1 and CP2 at a predetermined period. Thus, the terminal voltage output from the multiplexer 32 is fed to the one input terminal of the comparator 36 while the upper-limit voltage Vth_O and the lower-limit voltage Vth_U are alternately fed to the other input terminal of the comparator 36. In this case, the comparator 36 compares the terminal voltage of the battery cell 10, which is fed from the multiplexer 32, with the upper-limit voltage Vth_O and the lower-limit voltage Vth_U in this order, and outputs a signal representing a comparison result to the detection signal output circuit 37.

The detection signal output circuit 37 determines whether the terminal voltage of at least one of the plurality of battery cells 10 is the upper-limit voltage Vth_O or more while determining whether the terminal voltage of at least one of the plurality of battery cells 10 is the lower-limit voltage Vth_U or less based on the signal output from the comparator 36.

If the terminal voltage of at least one of the plurality of battery cells 10 is the upper-limit voltage Vth_O or more or the lower-limit voltage Vth_U or less, the detection signal output circuit 37 determines that the terminal voltage in the corresponding battery cell group BL is abnormal. If the terminal voltages of all the battery cells 10 are less than the upper-limit voltage Vth_O and are more than the lower-limit voltage Vth_U, the detection signal output circuit 37 determines that the terminal voltage in the corresponding battery cell group BL is normal.

In an example illustrated in FIG. 1 and FIG. 6, described below, no detection signal is fed to the receiving circuit 38a. Therefore, the receiving circuit 38a need not be provided. The detection signal output circuit 37 generates an "H"-level detection signal DT1, for example, representing an abnormality if it determines that the terminal voltage in the corresponding battery cell group BL is abnormal. The detection signal output circuit 37 generates an "L"-level detection signal DT1, for example, representing a normality if it determines that the terminal voltage in the corresponding battery cell group BL is normal. The transmission circuit 38b feeds the detection signal DT1 generated by the detection signal output circuit 37 to the corresponding operation processing device 40 via the connection line Q1 illustrated in FIG. 1 while feeding the detection signal DT1 to the operation processing device 40 in the battery module 100b via the signal line P1 illustrated in FIG. 1.

The cell-voltage-balancing circuit 70 includes a plurality of sets of series circuits each including a resistor R and a switching element SW. The one set of series circuits including the resistor R and the switching element SW is connected between the positive electrode and the negative electrode of each of the battery cells 10. The battery ECU 510 controls ON and OFF of the switching element SW via the operation processing device 40 illustrated in FIG. 1. In a normal state, the switching element SW is turned off.

A configuration of the voltage detector 20, the state detector 30, and the cell-voltage-balancing circuit 70 in the battery module 100b illustrated in FIG. 1 is similar to the configuration of the voltage detector 20, the state detector 30, and the cell-voltage-balancing circuit 70 in the battery module 100a except for the following points.

The detection signal output circuit 37 in the battery module 100b generates an "H"-level detection signal DT2, for example, representing an abnormality if it determines that the terminal voltage in the corresponding battery cell group BL is abnormal. The detection signal output circuit 37 generates an "L"-level detection signal DT2, for example, representing a normality if it determines that the terminal voltage in the corresponding battery cell group BL is normal. The transmission circuit 38b in the battery module 100b feeds the detection signal DT2 generated by the detection signal output circuit 37 to the corresponding operation processing device 40 via the connection line Q2 illustrated in FIG. 1 while feeding the detection signal DT2 to the operation processing device 40 in the battery module 100a via the signal line P2.

(3) Configuration Example of Printed Circuit Board

Figure 3:
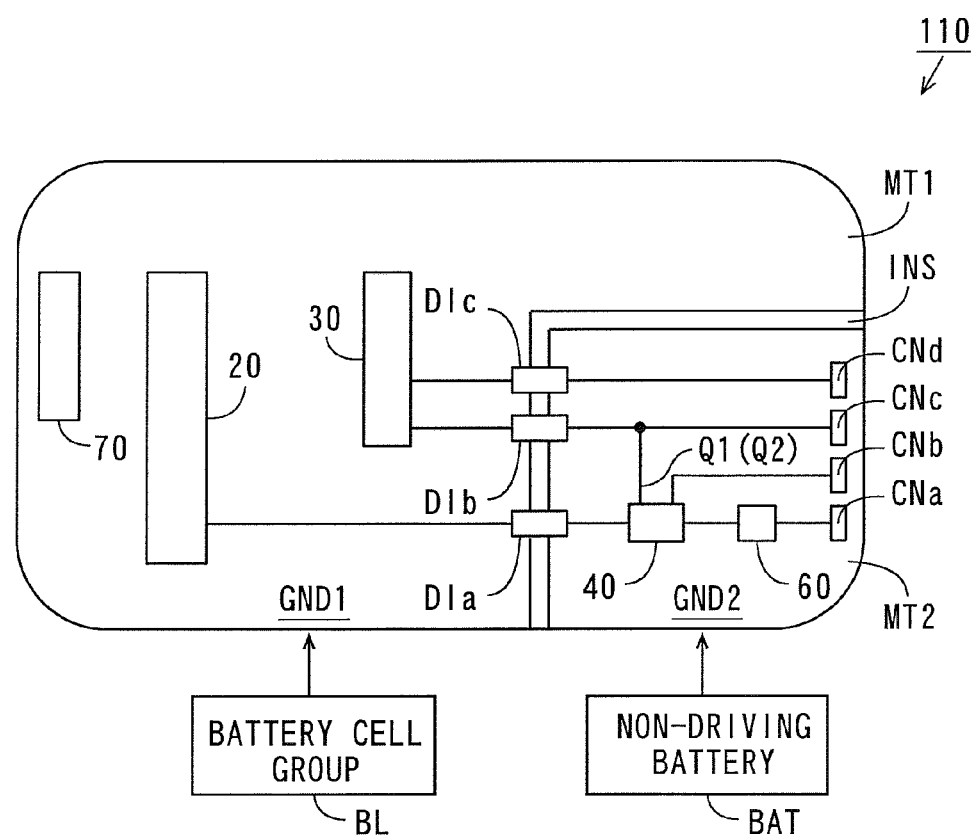
FIG. 3 is a schematic plan view illustrating one configuration example of a printed circuit board.

The voltage detector 20, the state detector 30, the operation processing device 40, the communication driver 60, and the cell-voltage-balancing circuit 70 in each of the battery modules 100a and 100b illustrated in FIG. 1 are mounted on a rigid printed circuit board (hereinafter referred to as a printed circuit board). FIG. 3 is a schematic plan view illustrating a configuration example of the printed circuit board. As illustrated in FIG. 3, insulating elements DIa, DIb, and DIc and connectors CNa, CNb, CNc, and CNd are further mounted on the printed circuit board 110. The printed circuit board 110 includes a first mounting region MT1, a second mounting region MT2, and a strip-shaped insulating region INS.

The second mounting region MT2 is formed at one corner of the printed circuit board 110. The insulating region INS is formed to extend along the second mounting region MT2. The first mounting region MT1 is formed in the remaining portion of the printed circuit board 110. The insulating region INS separates the first mounting region MT1 and the second mounting region MT2 from each other. Thus, the insulating region INS electrically insulates the first mounting region MT1 and the second mounting region MT2 from each other.

The voltage detector 20, the state detector 30, and the cell-voltage-balancing circuit 70 are mounted on the first mounting region MT1. As a power supply of the voltage detector 20, the state detector 30, and the cell-voltage-balancing circuit 70, a plurality of battery cells 10 in the battery cell group BL are connected to the voltage detector 20, the state detector 30, and the cell-voltage-balancing circuit 70.

A ground pattern GND1 is formed in the first mounting region MT1 except for mounting regions of the voltage detector 20, the state detector 30, and the cell-voltage-balancing circuit 70 and a formation region of a connection line. The ground pattern GND1 is retained at a reference potential (ground potential) of the plurality of battery cells 10 in the battery cell group BL.

The operation processing device 40, the communication driver 60, and the connectors CNa to CNd are mounted on the second mounting region MT2. As a power supply of the operation processing device 40 and the communication driver 60, a non-driving battery BAT for an electric vehicle is connected to the operation processing device 40 and the communication driver 60.

A ground pattern GND2 is formed in the second mounting region MT2 except for mounting regions of the operation processing device 40, the communication driver 60, and the connectors CNa to CNd and formation regions of a plurality of connection lines. The ground pattern GND2 is retained at the reference potential (ground potential) of the non-driving battery BAT.

Thus, the plurality of battery cells 10 in the battery cell group BL supply power to the voltage detector 20, the state detector 30, and the cell-voltage-balancing circuit 70, and the non-driving battery BAT supplies power to the operation processing device 40 and the communication driver 60. Therefore, the operation processing device 40 and the communication driver 60 can be stably operated independently of the voltage detector 20, the state detector 30, and the cell-voltage-balancing circuit 70.

The insulating element DIa is mounted to cross the insulating region INS. The insulating element DIa transmits a signal between the voltage detector 20 and the operation processing device 40 while electrically insulating the voltage detector 20 and the operation processing device 40 from each other. The insulating element DIb is mounted to cross the insulating region INS. The insulating element DIb transmits a signal between the transmission circuit 38b (see FIG. 2) in the state detector 30 and the operation processing device 40 via the connection line Q1 (or the connection line Q2) while electrically insulating the state detector 30 and the operation processing device 40 from each other. The insulating element DIb transmits a signal between the transmission circuit 38b (see FIG. 2) in the state detector 30 and the connector CNc while electrically insulating the state detector 30 and the connector CNc from each other. The insulating element DIc is mounted to cross the insulating region INS. The insulating element DIc transmits a signal between the receiving circuit 38a (see FIG. 2) in the state detector 30 and the connector CNd while electrically insulating the state detector 30 and the connector CNd from each other. Examples of the insulating elements DIa to DIc include a digital isolator and a photo coupler. In the present embodiment, a digital isolator is used as the insulating elements DIa to DIc.

In the second mounting region MT2, the operation processing device 40 and the connector CNa are connected to each other via the communication driver 60. Thus, the value of the terminal voltage of each of the plurality of battery cells 10 in each of the battery modules 100a and 100b and the value of the temperature of the battery modules 100a and 100b, which are output from the operation processing device 40, are given to the connector CNa via the communication driver 60. The bus BS illustrated in FIG. 1 is connected to the connector CNa. The connector CNb is connected to the operation processing device 40. The connector CNc of the battery module 100a and the connector CNb of the battery module 100b are connected to each other via the signal line P1 illustrated in FIG. 1. The connector CNb of the battery module 100a and the connector CNc of the battery module 100b are connected to each other via the signal line P2 illustrated in FIG. 1. In the example illustrated in FIG. 1 and FIG. 6, described below, the insulating element DIc and the connector CNd need not be provided.

(4) Another Configuration Example of Printed Circuit Board

Figure 4:
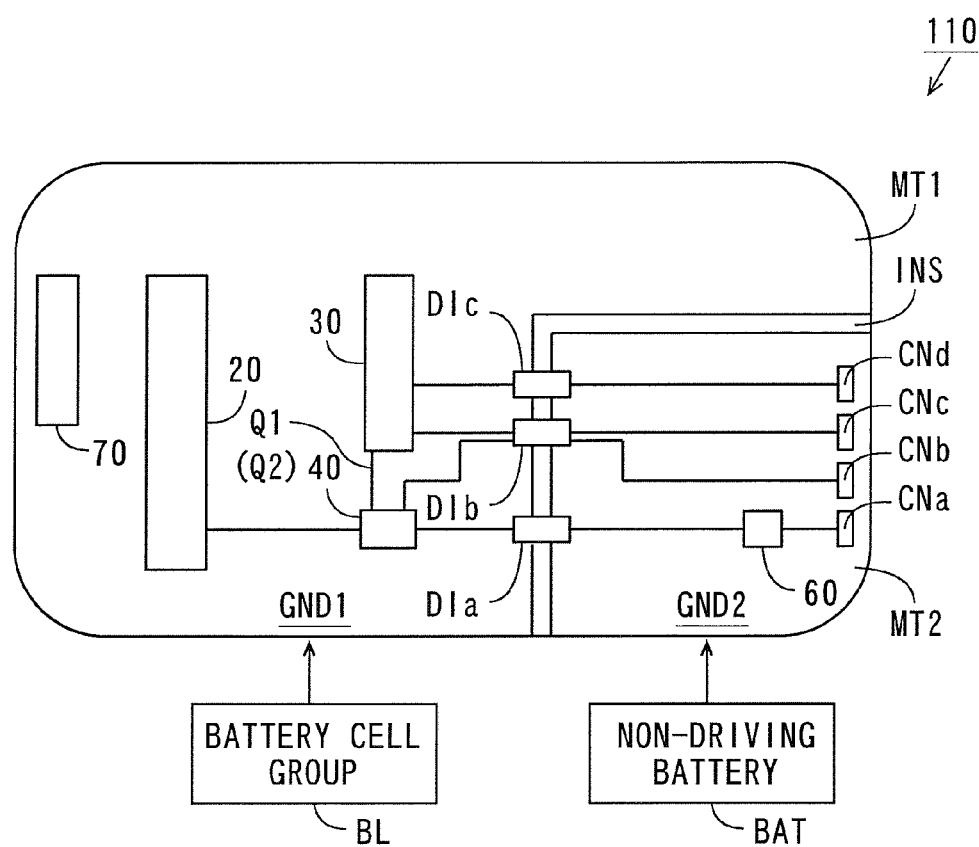
FIG. 4 is a schematic plan view illustrating another configuration example of the printed circuit board.

Another configuration example of the printed circuit board 110 will be described by referring to differences from the printed circuit board 110 illustrated in FIG. 3. FIG. 4 is a schematic plan view illustrating another configuration example of a printed circuit board 110. As illustrated in FIG. 4, an operation processing device 40 is mounted on not a second mounting region MT2 but a first mounting region MT1.

A plurality of battery cells 10 in a battery cell group BL supply power to the operation processing device 40. In this case, a configuration for supplying power to a voltage detector 20, a state detector 30, the operation processing device 40, and an cell-voltage-balancing circuit 70 is simplified.

In the first mounting region MT2, the state detector 30 and the operation processing device 40 are connected to each other via a connection line Q1 (or a connection line Q2). A connector CNa is connected to the operation processing device 40 via a communication driver 60 and an insulating element DIa. A connector CNb is connected to the operation processing device 40 via an insulating element DIb. A connector CNc is connected to a transmission circuit 38b (see FIG. 2) in the state detector 30 via the insulating element DIb. A connector CNd is connected to a receiving circuit 38a (see FIG. 2) in the state detector 30 via an insulating element DIc. In the example illustrated in FIG. 1 and FIG. 6, described below, the insulating element DIc and the connector CNd need not be provided.

(5) Equalization Processing of Terminal Voltage of Battery Cell

The battery ECU 510 acquires the value of the terminal voltage of each of the battery cells 10, which has been detected by the voltage detector 20, via the operation processing device 40. The battery ECU 510 feeds, if it determines that the value of the terminal voltage of any one of the battery cells 10 is higher than that of the terminal voltage of the other battery cell 10, a command signal for turning on the switching element SW in the cell-voltage-balancing circuit 70 corresponding to the battery cell 10 to the operation processing device 40. Thus, electric charge charged in the battery cell 10 is discharged via the resistor R.

The battery ECU 510 feeds, if it determines that the value of the terminal voltage of the battery cell 10 has decreased until it becomes substantially equal to the value of the terminal voltage of the other battery cell 10, a command signal for turning off the switching element SW in the cell-voltage-balancing circuit 70 corresponding to the battery cell 10 to the operation processing device 40. Thus, the values of the terminal voltages of all the battery cells 10 are kept substantially equal. This can prevent some of the battery cells 10 from being overcharged or overdischarged. As a result, the battery cell 10 can be prevented from being deteriorated.

(6) Another Example of Voltage Detector and State Detector

If the number of battery cells 10 in the battery cell group BL included in each of the battery modules 100a and 100b is large or if a withstand voltage of the voltage detector 20 or the state detector 30 is low, the battery modules 100a and 100b may include a plurality of the voltage detectors 20 and a plurality of state detectors 30 connected in series.

Figure 5:
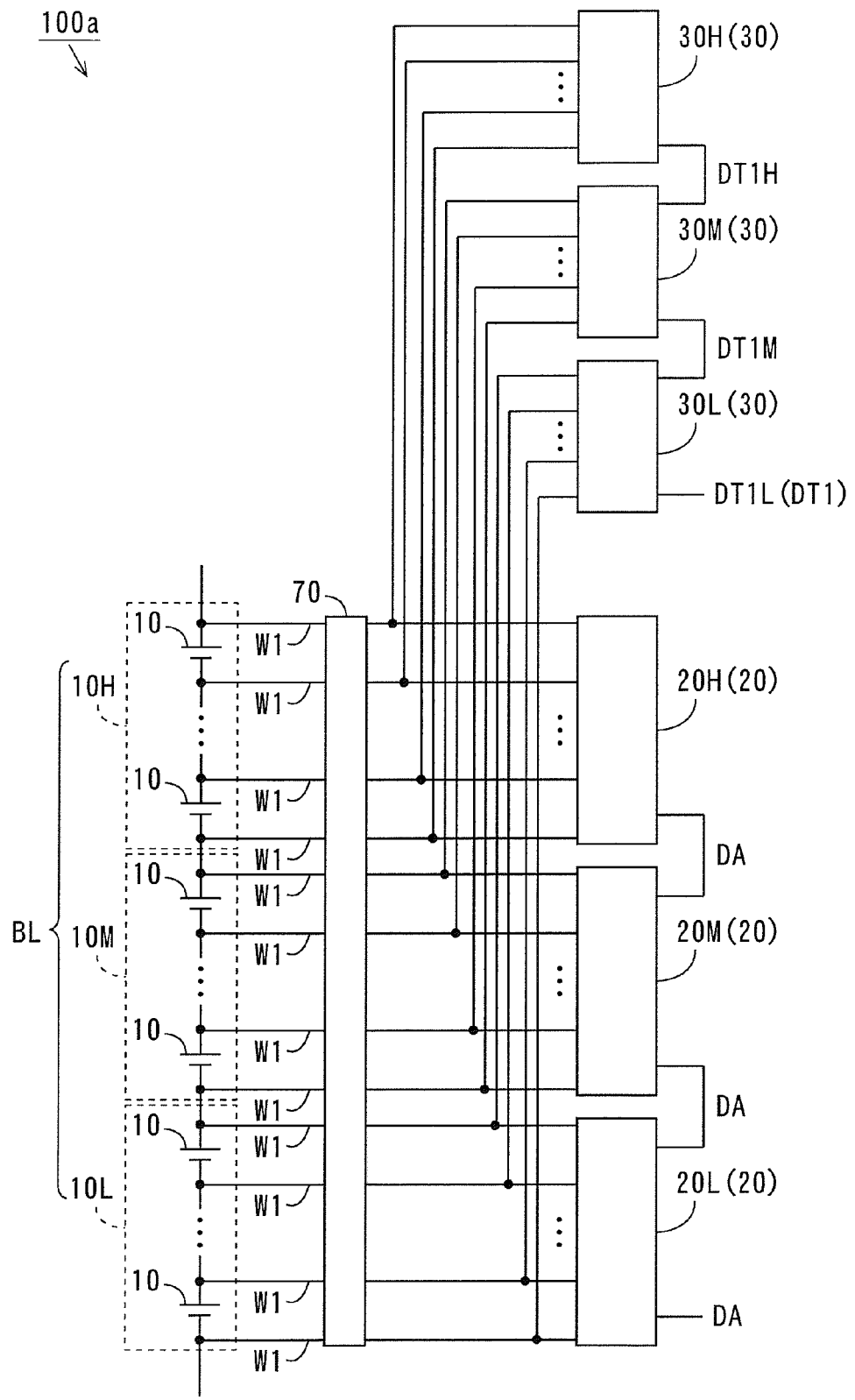
FIG. 5 is a block diagram illustrating a configuration in which each battery module includes a plurality of voltage detectors and a plurality of state detectors.

FIG. 5 is a block diagram illustrating a configuration in which each of the battery modules 100a and 100b includes a plurality of voltage detectors 20 and a plurality of state detectors 30. FIG. 5 illustrates a configuration of the battery module 100a. In an example illustrated in FIG. 5, the battery module 100a includes three voltage detectors 20 and three state detectors 30.

The one voltage detector 20 (hereinafter referred to as a voltage detector for low-potential 20L) corresponds to battery cells 10 on the low-potential side (hereinafter referred to as a battery cell group for low-potential 10L), the number of which is one third of the total number of the plurality of battery cells 10. The other voltage detector 20 (hereinafter referred to as a voltage detector for intermediate-potential 20M) corresponds to battery cells 10 at an intermediate potential (hereinafter referred to as a battery cell group for intermediate-potential 10M), the number of which is one third of the total number of the plurality of battery cells 10. The still other voltage detector 20 (hereinafter referred to as a voltage detector for high-potential 20H) corresponds to battery cells 10 on the high-potential side (hereinafter referred to as a battery cell group for high-potential 10H), the number of which is one third (six in this example) of the total number of the plurality of battery cells 10.

The voltage detector for low-potential 20L detects a terminal voltage of each of the plurality of battery cells 10 in the battery cell group for low-potential 10L. The voltage detector for intermediate-potential 20M detects a terminal voltage of each of the plurality of battery cells 10 in the battery cell group for intermediate-potential 10M. The voltage detector for high-potential 20H detects a terminal voltage of each of the plurality of battery cells 10 in the battery cell group for high-potential 10H.

A detection signal DA output from a transmission circuit 24 (see FIG. 2) in the voltage detector for high-potential 20H is fed to a transmission circuit 24 (see FIG. 2) in the voltage detector for low-potential 20L via a transmission circuit 24 (see FIG. 2) in the voltage detector for intermediate-potential 20M, and is fed to an operation processing device 40 from the transmission circuit 24 in the voltage detector for low-potential 20L. A detection signal DA output from the transmission circuit 24 in the voltage detector for intermediate-potential 20M is fed to the transmission circuit 24 in the voltage detector for low-potential 20L, and is fed to the operation processing device 40 from the transmission circuit 24 in the voltage detector for low-potential 20L. A detection signal DA output from the transmission circuit 24 in the voltage detector for low-potential 20L is fed to the operation processing device 40.

The one state detector 30 (hereinafter referred to as a state detector for low-potential 30L) corresponds to the battery cell group for low-potential 10L. The other state detector 30 (hereinafter referred to as a state detector for intermediate-potential 30M) corresponds to the battery cell group for intermediate-potential 10M. The still other state detector 30 (hereinafter referred to as a state detector for high-potential 30H) corresponds to the battery cell group for high-potential 10H.

The state detector for low-potential 30L detects the presence or absence of an abnormality in each of the plurality of battery cells 10 in the battery cell group for low-potential 10L. The state detector for intermediate-potential 30M detects the presence or absence of an abnormality in each of the plurality of battery cells 10 in the battery cell group for intermediate-potential 10M. The state detector for high-potential 30H detects the presence or absence of an abnormality in each of the plurality of battery cells 10 in the battery cell group for high-potential 10H.

In this case, a transmission circuit 38b (see FIG. 2) in the state detector for high-potential 30H and a receiving circuit 38a (see FIG. 2) in the state detector for intermediate-potential 30M are connected to each other. A transmission circuit 38b (see FIG. 2) in the state detector for intermediate-potential 30M and a receiving circuit 38a (see FIG. 2) in the state detector for low-potential 30L are connected to each other. A transmission circuit 38b (see FIG. 2) in the state detector for low-potential 30L is connected to the operation processing device 40 (see FIGS. 3 and 4) via an insulating element DIb (see FIGS. 3 and 4) while being connected to a connector CNc (see FIGS. 3 and 4) via the insulating element DIb. A receiving circuit 38a in the state detector for high-potential 30H need not be provided.

In the state detector for high-potential 30H, a detection signal output circuit 37 (see FIG. 2) generates an "H"-level detection signal DT1H, for example, representing an abnormality if it determines that the terminal voltage in the corresponding battery cell group for high-potential 10H is abnormal. The detection signal output circuit 37 generates an "L"-level detection signal DT1H, for example, representing a normality if it determines that the terminal voltage in the corresponding battery cell group for high-potential 10H is normal. The transmission circuit 38b (see FIG. 2) feeds the detection signal DT1H generated by the detection signal output circuit 37 to the state detector for intermediate-potential 30M.

In the state detector for intermediate-potential 30M, the receiving circuit 38a (see FIG. 2) feeds the detection signal DT1H fed by the state detector for high-potential 30H to the detection signal output circuit 37 (see FIG. 2). The detection signal output circuit 37 generates an "H"-level detection signal DT1M, for example, representing an abnormality if it determines that the terminal voltage in the corresponding battery cell group for intermediate-potential 10M is abnormal or if the detection signal DT1 H fed by the receiving circuit 38a is at an "H" level (abnormal). The detection signal output circuit 37 generates an "L"-level detection signal DT1M, for example, representing a normality if it determines that the terminal voltage in the corresponding battery cell group for intermediate-potential 10M is normal and the detection signal DT1 H fed by the receiving circuit 38a is at an "L" level (normal). The transmission circuit 38b (see FIG. 2) feeds the detection signal DT1M generated by the detection signal output circuit 37 to the state detector for low-potential 30L.

In the state detector for low-potential 30L, the receiving circuit 38a (see FIG. 2) feeds the detection signal DT1M fed by the state detector for intermediate-potential 30M to the detection signal output circuit 37 (see FIG. 2). The detection signal output circuit 37 generates an "H"-level detection signal DT1L, for example, representing an abnormality if it determines that the terminal voltage in the corresponding battery cell group for low-potential 10L is abnormal or if the detection signal DT1M fed by the receiving circuit 38a is at an "H" level (abnormal). The detection signal output circuit 37 generates an "L"-level detection signal DT1L, for example, representing a normality if it determines that the terminal voltage in the corresponding battery cell group for low-potential 10L is normal and the detection signal DT1M fed by the receiving circuit 38a is at an "L" level (normal). The transmission circuit 38b (see FIG. 2) feeds the detection signal DT1L generated by the detection signal output circuit 37, as a detection signal DT1, to the corresponding operation processing device 40 (see FIG. 1) and a signal line P1 (see FIG. 1).

An operation of the state detector 30 in the other battery module 100b is similar to an operation of the state detector 30 in the battery module 100a except for the following points. The state detector for low-potential 30L in the battery module 100b feeds a detection signal DT2, instead of the detection signal DT1, to the corresponding operation processing device 40 (see FIG. 1) and a signal line P2 (see FIG. 1).

(7) Operation and Effects of Battery System

The battery cell group BL, the voltage detector 20, the state detector 30, the operation processing device 40, and the communication driver 60 in the battery module 100a are respectively referred to as a battery cell group BLa, a voltage detector 20a, a state detector 30a, an operation processing device 40a, and a communication driver 60a. The battery cell group BL, the voltage detector 20, the state detector 30, the operation processing device 40, and the communication driver 60 in the battery module 100b are respectively referred to as a battery cell group BLb, a voltage detector 20b, a state detector 30b, an operation processing device 40b, and a communication driver 60b.

In the battery module 100a, the state detector 30a generates a detection signal DT1 representing an abnormality if it determines that a terminal voltage in the corresponding battery cell group
BLa is abnormal. On the other hand, the state detector 30a generates a detection signal DT1 representing a normality if it determines that a terminal voltage in the corresponding battery cell group BLa is normal. The detection signal DT1 generated by the state detector 30a is fed to the corresponding operation processing device 40a via the connection line Q1 while being fed to the operation processing device 40b in the battery module 100b via the signal line P1.

In the battery module 100b, the state detector 30b generates a detection signal DT2 representing an abnormality if it determines that a terminal voltage in the corresponding battery cell group BLb is abnormal. On the other hand, the state detector 30b generates a detection signal DT2 representing a normality if it determines that a terminal voltage in the corresponding battery cell group BLb is normal. The detection signal DT2 generated by the state detector 30b is fed to the corresponding operation processing device 40b via the connection line Q2 while being fed to the operation processing device 40a in the battery module 100a via the signal line P2.

In the battery module 100a, the operation processing device 40a feeds the detection signal DT1 fed by the corresponding state detector 30a and the detection signal DT2 fed by the state detector 30b in the battery module 100b to the battery ECU 510 via the communication driver 60a and the bus BS.

In the battery module 100b, the operation processing device 40b feeds the detection signal DT2 fed by the corresponding state detector 30b and the detection signal DT1 fed by the state detector 30a in the battery module 100a to the battery ECU 510 via the communication driver 60b and the bus BS.

More specifically, in the present embodiment, the state detector 30a serving as a first state detector generates, when it detects an abnormal state relating to charge and discharge of the battery cell group BLa serving as a first battery cell group in the battery module 100a serving as a first battery module, the detection signal DT1 serving as a first detection signal. The state detector 30b serving as a second state detector generates, when it detects an abnormal state relating to charge and discharge of the battery cell group BL2 serving as a second battery cell group in the battery module 100b serving as a second battery module, the state detector DT2 serving as a second detection signal.

The operation processing device 40a serving as a first communication circuit sends the detection signal DT1 generated by the state detector 30a to an external object. More specifically, the detection signal DT1 generated by the state detector 30a is transmitted to the operation processing device 40a via the connection line Q1 serving as a second communication path while being transmitted to the operation processing device 40b via the signal line P1 serving as a first communication path.

The operation processing device 40b serving as a second communication circuit sends the detection signal DT2 generated by the state detector 30b to an external object. More specifically, the detection signal DT2 generated by the state detector 30b is transmitted to the operation processing device 40b via the connection line Q2 serving as a fifth communication path while being transmitted to the operation processing device 40a via the signal line P2 serving as a fourth communication path.

If the terminal voltages of all the battery cells 10 in the battery modules 100a and 100b are thus determined to be normal, the battery ECU 510 acquires the detection signals DT1 and DT2 representing a normality from the battery modules 100a and 100b, respectively. On the other hand, if the terminal voltage of at least one of the battery cells 10 in the battery modules 100a and 100b is determined to be abnormal, the battery ECU 510 acquires the detection signals DT1 and DT2 representing an abnormality from the battery modules 100a and 100b, respectively. Thus, the battery ECU 510 can detect the presence or absence of an abnormality in the terminal voltage of each of the plurality of battery cells 10 in each of the battery modules 100a and 100b.

According to the above-mentioned configuration, even if the operation processing device 40a or the communication driver 60a in the battery module 100a has failed or if a defect has occurred in the connection line Q1, the detection signal DT1 can be sent to the battery ECU 510 from the state detector 30a in the battery module 100a via the signal line P1, the operation processing device 40b and the communication driver 60b in the battery module 100b, and the bus BS. Even if the operation processing device 40b or the communication driver 60b in the battery module 100b has failed or if a defect has occurred in the connection line Q2, the detection signal DT2 can be sent to the battery ECU 510 from the state detector 30b in the battery module 100b via the signal line P2, the operation processing device 40a, and the communication driver 60a in the battery module 100a, and the bus BS. Therefore, the battery ECU 510 can be reliably notified of abnormalities in the terminal voltages in the battery cell groups BLa and BLb without providing an additional circuit in the battery system 500. This can result in an improvement in the reliability of the battery system 500 while suppressing an increase in cost of the battery system 500.

Simultaneously, the battery ECU 510 acquires a value of the terminal voltage of each of the plurality of battery cells 10 in the battery cell group BLa from the voltage detector 20a in the battery module 100a via the operation processing device 40a, the communication driver 60a, and the bus BS. The battery ECU 510 acquires a value of the terminal voltage of each of the plurality of battery cells 10 in the battery cell group BLb from the voltage detector 20b in the battery module 100b via the operation processing device 40b, the communication driver 60b, and the bus BS. Thus, the battery ECU 510 can detect the presence or absence of an abnormality in each of the plurality of battery cells 10 in each of the battery modules 100a and 100b based on the acquired values of the terminal voltages.

According to the above-mentioned configuration, even if the state detector 30a and 30b have failed or if defects have occurred in the signal lines P1 and P2, the battery ECU 510 can be notified of the value of the terminal voltage in the battery cell group BLa, which has been detected by the voltage detector 20a in the battery module 100a, via the operation processing device 40a, the communication driver 60a, and the bus BS. The battery ECU 510 can be notified of the value of the terminal voltage in the battery cell group BLb, which has been detected by the voltage detector 20b in the battery module 100b, via the operation processing device 40b, the communication driver 60b, and the bus BS. On the other hand, even if the voltage detectors 20a and 20b have failed, the battery ECU 510 can be notified of an abnormality in the terminal voltage in the battery cell group BLa, which has been detected by the state detector 30a in the battery module 100a, via the connection line Q1, the operation processing device 40a, the communication driver 60a, and the bus BS. The battery ECU 510 can be notified of an abnormality in the terminal voltage in the battery cell group BLb, which has been detected by the state detector 30b in the battery module 100b, via the connection line Q2, the operation processing device 40b, the communication driver 60b, and the bus BS. This can result in an improvement in the reliability of the battery system 500.

[2] Second Embodiment (1) Configuration of Battery System

A battery system 500 according to a second embodiment will be described by referring to differences from the battery system 500 according to the first embodiment. FIG. 6 is a block diagram illustrating a configuration of the battery system 500 according to the second embodiment.

Figure 6:
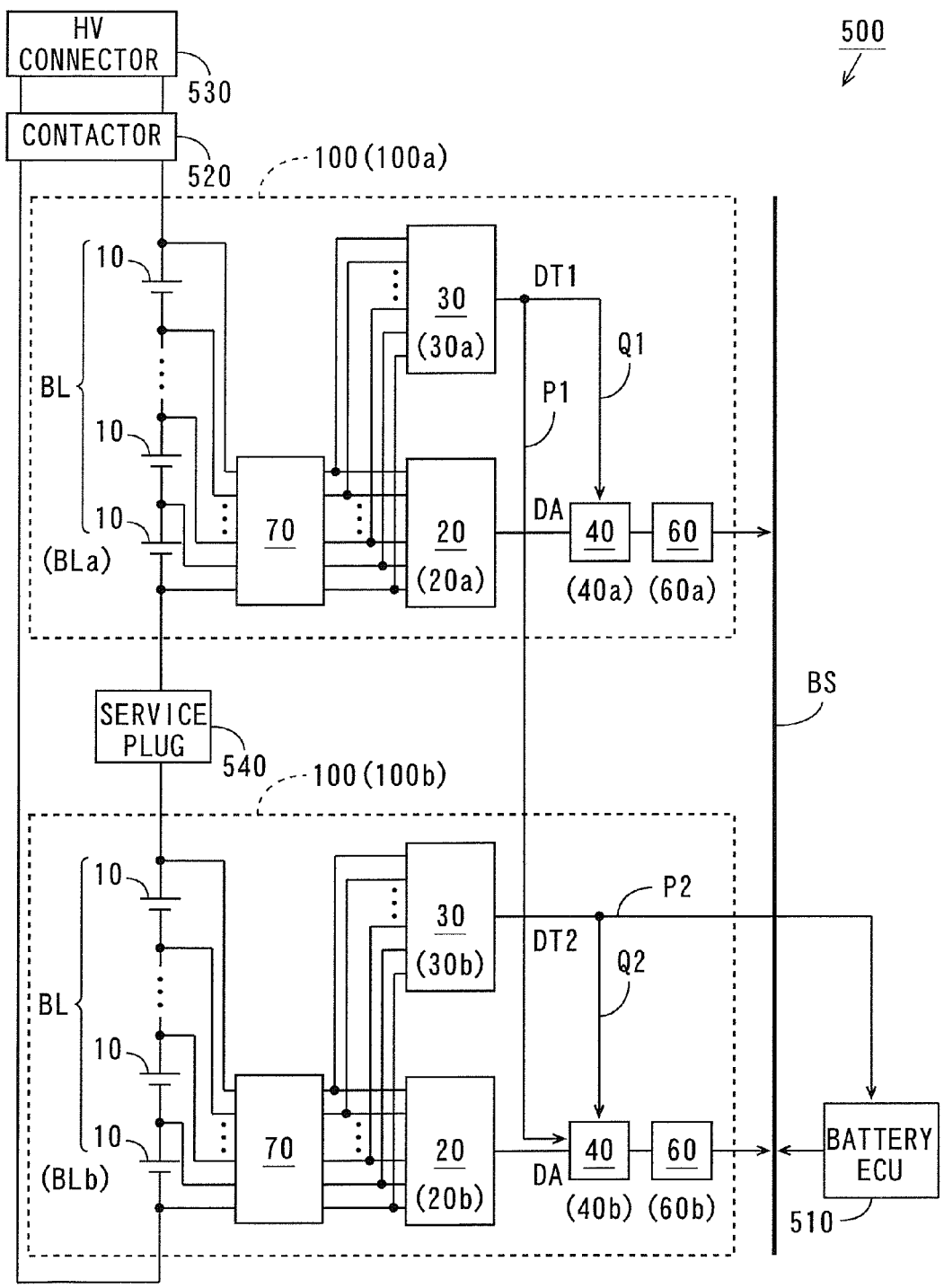
FIG. 6 is a block diagram illustrating a configuration of a battery system according to a second embodiment.

As illustrated in FIG. 6, a state detector 30a in a battery module 100a detects the presence or absence of an abnormality in a terminal voltage of each of a plurality of battery cells 10 in a corresponding battery cell group BLa, and generates a detection signal DT1 representing its detection result. The detection signal DT1 generated by the state detector 30a in the battery module 100a is fed to a corresponding operation processing device 40a via a connection line Q1 while being fed to an operation processing device 40b in a battery module 100b via a signal line P1.

A state detector 30b in the battery module 100b detects the presence or absence of an abnormality in a terminal voltage of each of a plurality of battery cells 10 in a corresponding battery cell group BLb, and generates a detection signal DT2 representing its detection result. The detection signal DT2 generated by the state detector 30b in the battery module 100b is fed to a corresponding operation processing device 40b via a connection line Q2 while being fed to a battery ECU 510 via a signal line P2.

In this case, a connector CNc of a printed circuit board 110 (see FIGS. 3 and 4) in the battery module 100a and a connector CNb of a printed circuit board 110 (see FIGS. 3 and 4) in the battery module 100b are connected to each other via the signal line P1. A connector CNc of the printed circuit board 110 in the battery module 100b and the battery ECU 510 are connected to each other via the signal line P2. A connector CNb need not be provided in the printed circuit board 110 in the battery module 110a.

(2) Operation and Effects of Battery System p In the battery module 100a, the detection signal DT1 generated by the state detector 30a is fed to the corresponding operation processing device 40a via the connection line Q1 while being fed to the operation processing device 40b in the battery module 100b via the signal line P1. In the battery module 100b, the detection signal DT2 generated by the state detector 30b is fed to the corresponding operation processing device 40b via the connection line Q2 while being fed to the battery ECU 510 via the signal line P2.

In the battery module 100a, the operation processing device 40a feeds the detection signal DT1 fed by the corresponding state detector 30a to the battery ECU 510 via a communication driver 60a and a bus BS. In the battery module 100b, the operation processing device 40b feeds the detection signal DT2 fed by the corresponding state detector 30b and the detection signal DT1 fed by the state detector 30a in the battery module 100a to the battery ECU 510 via a communication driver 60b and the bus BS.

More specifically, the detection signal DT1 generated by the state detector 30a is transmitted to the operation processing device 40a via the connection line Q1 serving as a second communication path while being transmitted to the operation processing device 40b via the signal line P1 serving as a first communication path. The detection signal DT2 generated by the state detector 30b is transmitted to the operation processing device 40b via the connection line Q2 serving as a fifth communication path while being transmitted to the battery ECU 510 serving as an external object via the signal line P2 serving as a seventh communication path.

According to the above-mentioned configuration, even if the operation processing device 40a or the communication driver 60a in the battery module 100a has failed or if a defect has occurred in the connection line Q1, the detection signal DT1 can be sent to the battery ECU 510 from the state detector 30a in the battery module 100a via the signal line P1, the operation processing device 40b and the communication driver 60b in the battery module 100b, and the bus BS. Even if the operation processing device 40b or the communication driver 60b in the battery module 100b has failed or if a defect has occurred in the connection line Q2, the detection signal DT2 can be sent to the battery ECU 510 from the state detector 30b in the battery module 100b via the signal line P2. Therefore, the battery ECU 510 can be reliably notified of abnormalities in the terminal voltages in the battery cell groups BLa and BLb without providing an additional communication circuit in the battery system 500. This can result in an improvement in the reliability of the battery system 500 while suppressing an increase in cost of the battery system 500.

[3] Third Embodiment (1) Configuration of Battery System

Figure 7:
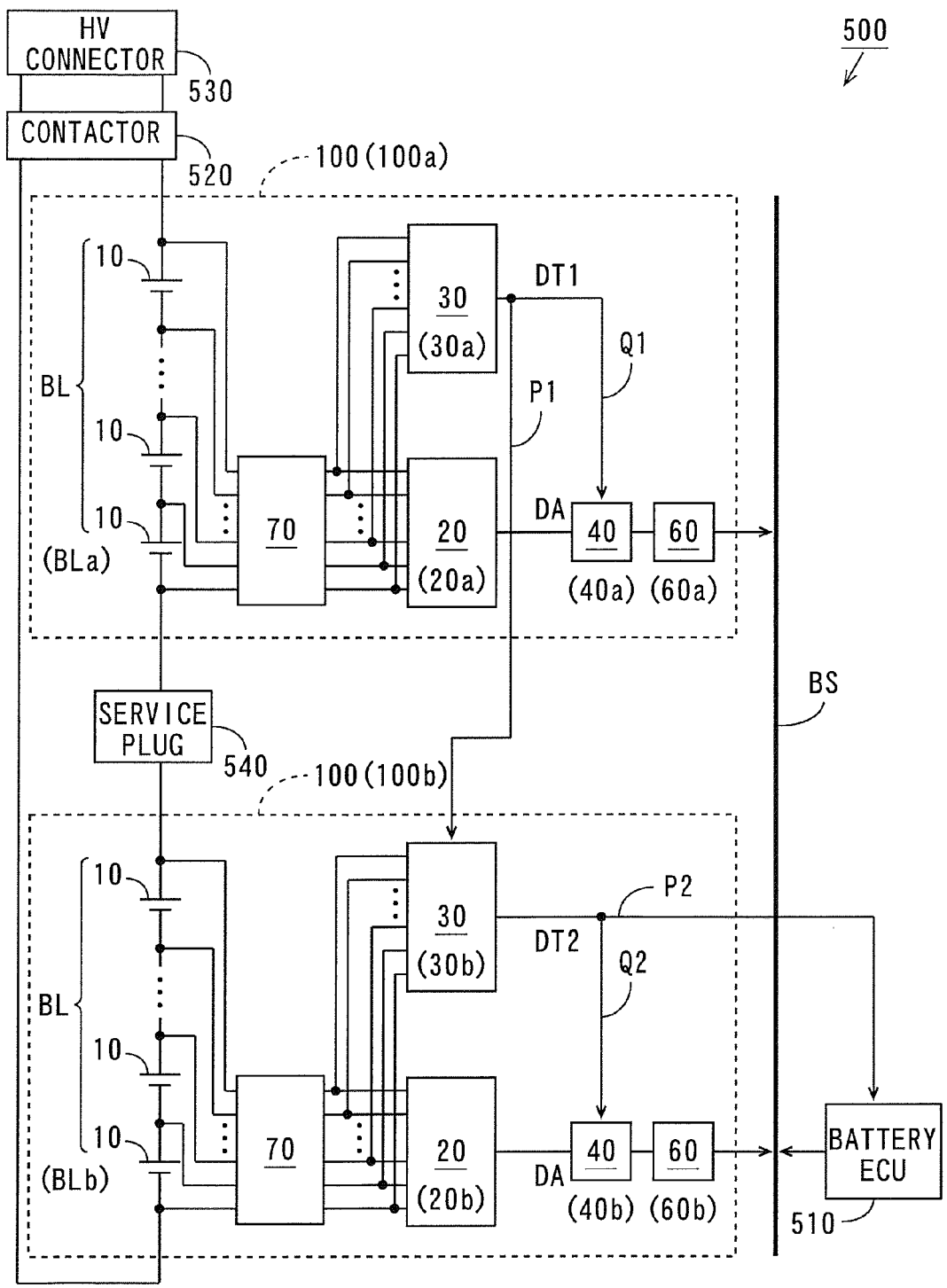
FIG. 7 is a block diagram illustrating a configuration of a battery system according to a third embodiment.

A battery system 500 according to a third embodiment will be described by referring to differences from the battery system 500 according to the first embodiment. FIG. 7 is a block diagram illustrating a configuration of the battery system 500 according to the third embodiment.

As illustrated in FIG. 7, a state detector 30a in a battery module 100a detects the presence or absence of an abnormality in a terminal voltage of each of a plurality of battery cells 10 in a corresponding battery cell group BLa, and generates a detection signal DT1 representing its detection result. The detection signal DT1 generated by the state detector 30a in the battery module 100a is fed to a corresponding operation processing device 40a via a connection line Q1 while being fed to a state detector 30b in a battery module 100b via a signal line P1.

The state detector 30b in the battery module 100b detects the presence or absence of an abnormality in a terminal voltage of each of a plurality of battery cells 10 in a corresponding battery cell group BLb, and generates a detection signal DT2 based on its detection result and the detection signal DT1 fed from the state detector 30a in the battery module 100a. The detection signal DT2 generated by the state detector 30b in the battery module 100b is fed to a corresponding operation processing device 40b via a connection line Q2 while being fed to a battery ECU 510 via a signal line P2.

In this case, a connector CNc of a printed circuit board 110 (see FIGS. 3 and 4) in the battery module 100a and a connector CNd of a printed circuit board 110 (see FIGS. 3 and 4) in the battery module 100b are connected to each other via the signal line P1. A connector CNc of the printed circuit board 110 in the battery module 100b and the battery ECU 510 are connected to each other via the signal line P2. Connectors CNb and CNd and an insulating element DIc (see FIGS. 3 and 4) need not be provided in the printed circuit board 110 in the battery module 110a.

(2) Operation and Effects of Battery System

In the battery module 100a, the detection signal DT1 generated by the state detector 30a is fed to the corresponding operation processing device 40a via the connection line Q1 while being fed to the state detector 30b in the battery module 100b via the signal line P1.

A receiving circuit 38a (see FIG. 2) in the state detector 30b in the battery module 100b feeds the detection signal DT1, which has been fed to the connector CNd, to a detection signal output circuit 37. The detection signal output circuit 37 generates an "H"-level detection signal DT2, for example, representing an abnormality if it determines that the terminal voltage in the corresponding battery cell group BL is abnormal or if the detection signal DT1 fed by the receiving circuit 38a is at an "H" level (abnormal). The detection signal output circuit 37 generates an "L"-level detection signal DT2, for example, representing a normality if it determines that the terminal voltage in the corresponding battery cell group BL is normal and the detection signal DT1 fed by the receiving circuit 38a is at an "L" level (normal). A transmission circuit 38b outputs the detection signal DT2 generated by the detection signal output circuit 37. Thus, in the battery module 100b, the detection signal DT2 generated by the state detector 30b is fed to the corresponding operation processing device 40b via the connection line Q2 while being fed to the battery ECU 510 via the signal line P2. More specifically, if the terminal voltage in the battery cell group BLa in the battery module 100a is abnormal, the detection signal DT1 representing an abnormality is fed, as the detection signal DT2, to the operation processing device 40b in the battery module 100b and the battery ECU 510 from the state detector 30b in the battery module 100b.

In the battery module 100a, the operation processing device 40a feeds the detection signal DT1, which has been fed by the corresponding state detector 30a, to the battery ECU 510 via a communication driver 60a and a bus BS. In the battery module 100b, the operation processing device 40b feeds the detection signal DT2 fed by the corresponding state detector 30b to the battery ECU 510 via a communication driver 60b and the bus BS.

More specifically, the detection signal DT1 generated by the state detector 30a is transmitted to the operation processing device 40a via the connection line Q1 serving as a second communication path while being transmitted to the state detector 30b via the signal line P1 serving as a third communication path. The detection signal DT2 generated by the state detector 30b is transmitted to the operation processing device 40b via the connection line Q2 serving as a fifth communication path while being transmitted to the battery ECU 510 via the signal line P2 serving as a seventh communication path.

According to the above-mentioned configuration, even if the operation processing device 40a or the communication driver 60a in the battery module 100a has failed or if a defect has occurred in the connection line Q1, the detection signal DT1 can be sent, as the detection signal DT2, to the battery ECU 510 from the state detector 30a in the battery module 100a via the signal line P1, the state detector 30b, the operation processing device 40b, and the communication driver 60b in the battery module 100b, and the bus BS. The detection signal can be sent, as the detection signal DT2, to the battery ECU 510 from the state detector 30a in the battery module 100a via the signal line P1, and the state detector 30b in the battery module 100b, and the signal line P2.

Further, even if the operation processing device 40b or the communication driver 60b in the battery module 100b has failed or if a defect has occurred in the connection line Q2, the detection signal DT2 can be sent to the battery ECU 510 from the state detector 30b in the battery module 100b via the signal line P2. Therefore, the battery ECU 510 can be notified of abnormalities in the terminal voltages in the battery cell groups BLa and BLb without providing an additional communication circuit in the battery system 500.

In the above-mentioned configuration, even if the operation processing device 40a and the communication driver 60a in the battery module 100a and the operation processing device 40b and the communication driver 60b in the battery module 100b have failed and defects have occurred in the connection lines Q1 and Q2, the battery ECU 510 can be notified of abnormalities in the terminal voltages in the battery cell groups BLa and BLb. This can further improve the reliability of the battery system 500 while suppressing an increase in cost of the battery system 500.

[4] Fourth Embodiment (1) Configuration of Battery System

Figure 8:
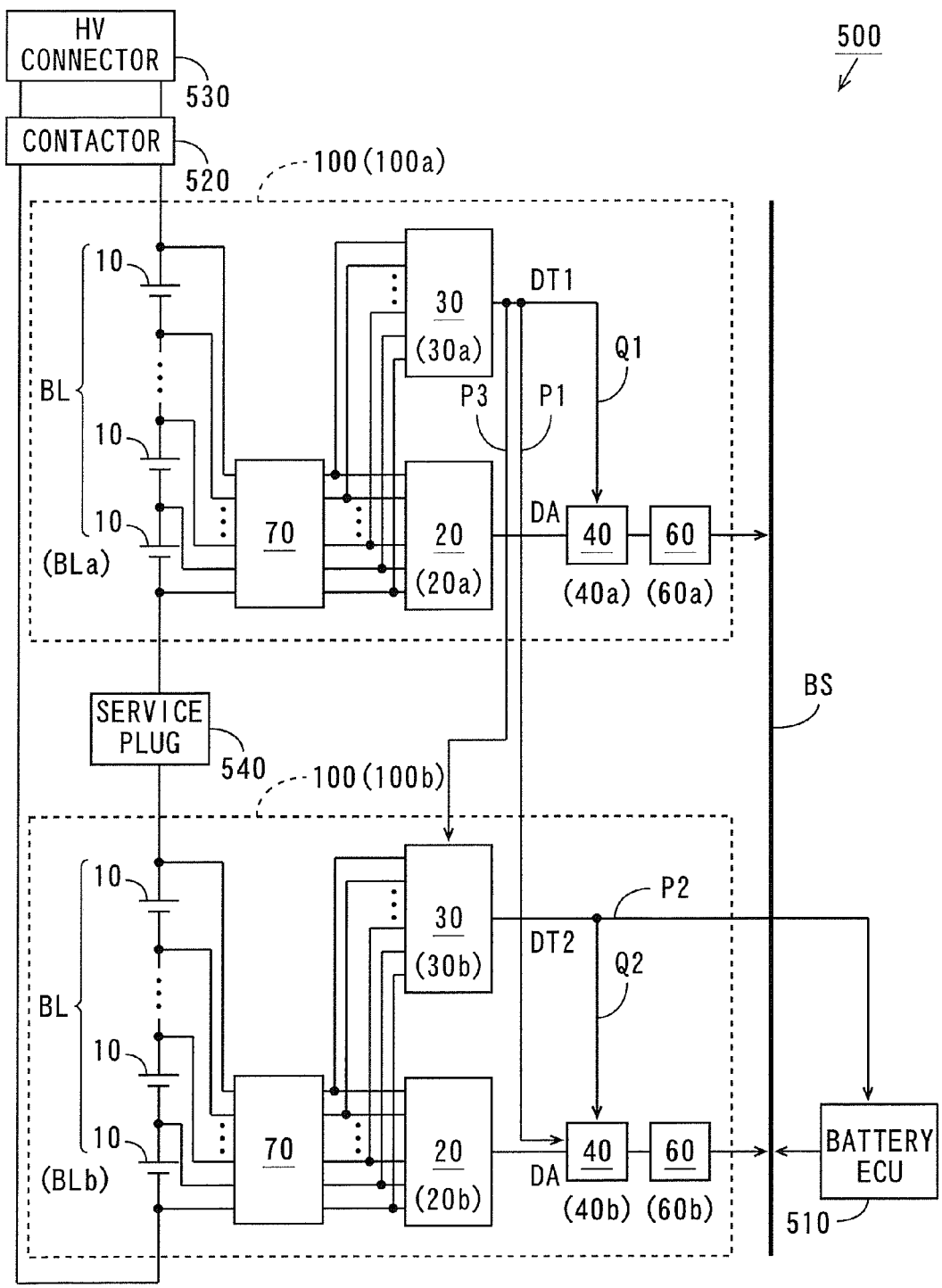
FIG. 8 is a block diagram illustrating a configuration of a battery system according to a fourth embodiment.

A battery system 500 according to a fourth embodiment will be described by referring to differences from the battery system 500 according to the third embodiment. FIG. 8 is a block diagram illustrating a configuration of the battery system 500 according to the fourth embodiment.

As illustrated in FIG. 8, a state detector 30a in a battery module 100a detects the presence or absence of an abnormality in a terminal voltage of each of a plurality of battery cells 10 in a corresponding battery cell group BLa, and generates a detection signal DT1 representing its detection result. The detection signal DT1 generated by the state detector 30a in the battery module 100a is fed to a corresponding operation processing device 40a via a connection line Q1 while being fed to a state detector 30b in a battery module 100b via a signal line P1. The detection signal DT1 generated by the state detector 30a in the battery module 100a is fed to an operation processing device 40b in the battery module 100b via a signal line P3.

The state detector 30b in the battery module 100b detects the presence or absence of an abnormality in a terminal voltage of each of a plurality of battery cells 10 in a corresponding battery cell group BLb, and generates a detection signal DT2 based on its detection result and the detection signal DT1 fed form the state detector 30a in the battery module 100a. The detection signal DT2 generated by the state detector 30b in the battery module 100b is fed to a corresponding operation processing device 40b via a connection line Q2 while being fed to a battery ECU 510 via a signal line P2.

In this case, a connector CNc of a printed circuit board 110 (see FIGS. 3 and 4) in the battery module 100a and a connector CNd of a printed circuit board 110 (see FIGS. 3 and 4) in the battery module 100b are connected to each other via the signal line P1. The connector CNc of the printed circuit board 110 in the battery module 100a and a connector CNb of the printed circuit board 110 in the battery module 100b are connected to each other via the signal line P3. Further, a connector CNc of the printed circuit board 110 in the battery module 100b and the battery ECU 510 are connected to each other via the signal line P2. Connectors CNb and CNd and an insulating element DIc (see FIGS. 3 and 4) need not be provided in the printed circuit board 110 in the battery module 110a.

(2) Operation and Effects of Battery System

In the battery module 100a, the detection signal DT1 generated by the state detector 30a is fed to the corresponding operation processing device 40a via the connection line Q1 while being fed to the state detector 30b in the battery module 100b via the signal line P1. The detection signal DT1 generated by the state detector 30a is fed to the operation processing device 40b in the battery module 100b via the signal line P3. In the battery module 100b, the detection signal DT2 generated by the state detector 30b is fed to the corresponding operation processing device 40b via the signal line Q2 while being fed to the battery ECU 510 via the signal line P2. More specifically, if the terminal voltage in the battery cell group BLa in the battery module 100a is abnormal, the detection signal representing an abnormality is fed, as the detection signal DT2, to the operation processing device 40b in the battery module 100b and the battery ECU 510 from the state detector 30b in the battery module 100b.

In the battery module 100a, the operation processing device 40a feeds the detection signal DT1, which has been fed by the corresponding state detector 30a, to the battery ECU 510 via a communication driver 60a and a bus BS. In the battery module 100b, the operation processing device 40b feeds the detection signal DT2 fed by the corresponding state detector 30b and the detection signal DT1 fed by the state detector 30a in the battery module 100a to the battery ECU 510 via a communication driver 60b and the bus BS.

More specifically, the detection signal DT1 generated by the state detector 30a is transmitted to the operation processing device 40a via the connection line Q1 serving as a second communication path while being transmitted to the operation processing device 40b via the signal line P1 serving as a first communication path and transmitted to the state detector 30b via the signal line P3 serving as a third communication path. The detection signal DT2 generated by the state detector 30b is transmitted to the operation processing device 40b via the connection line Q2 serving as a fifth communication path while being transmitted to the battery ECU 510 via the signal line P2 serving as a seventh communication path.

According to the above-mentioned configuration, even if the operation processing device 40a or the communication driver 60a in the battery module 100a has failed or if a defect has occurred in the connection line Q1, the detection signal DT1 can be sent, as the detection signal DT2, to the battery ECU 510 from the state detector 30a in the battery module 100a via the signal line P1, the state detector 30b, the operation processing device 40b, and the communication driver 60b in the battery module 100b, and the bus BS. The detection signal DT1 can be sent, as the detection signal DT2, to the battery ECU 510 from the state detector 30b in the battery module 100a via the signal line P1, the state detector 30b in the battery module 100b, and the signal line P2. Further, the detection signal DT1 can be sent to the battery ECU 510 from the state detector 30a in the battery module 100a via the signal line P3, the operation processing device 40b and the communication driver 60b in the battery module 100b, and the bus BS.

Even if the operation processing device 40b or the communication driver 60b in the battery module 100b has failed or if a defect has occurred in the connection line Q2, the detection signal DT2 can be sent to the battery ECU 510 from the state detector 30b in the battery module 100b via the signal line P2. Therefore, the battery ECU 510 can be reliably notified of abnormalities in the terminal voltages in the battery cell groups BLa and BLb without providing an additional communication circuit in the battery system 500.

In the above-mentioned configuration, even if the operation processing device 40a and the communication driver 60a in the battery module 100a and the operation processing device 40b and the communication driver 60b in the battery module 100b have failed and defects have occurred in the connection lines Q1 and Q2, the battery ECU 510 can be notified of abnormalities in the terminal voltages in the battery cell groups BLa and BLb. This can further improve the reliability of the battery system 500 while suppressing an increase in cost of the battery system 500.

[5] Battery Module

Figure 9:
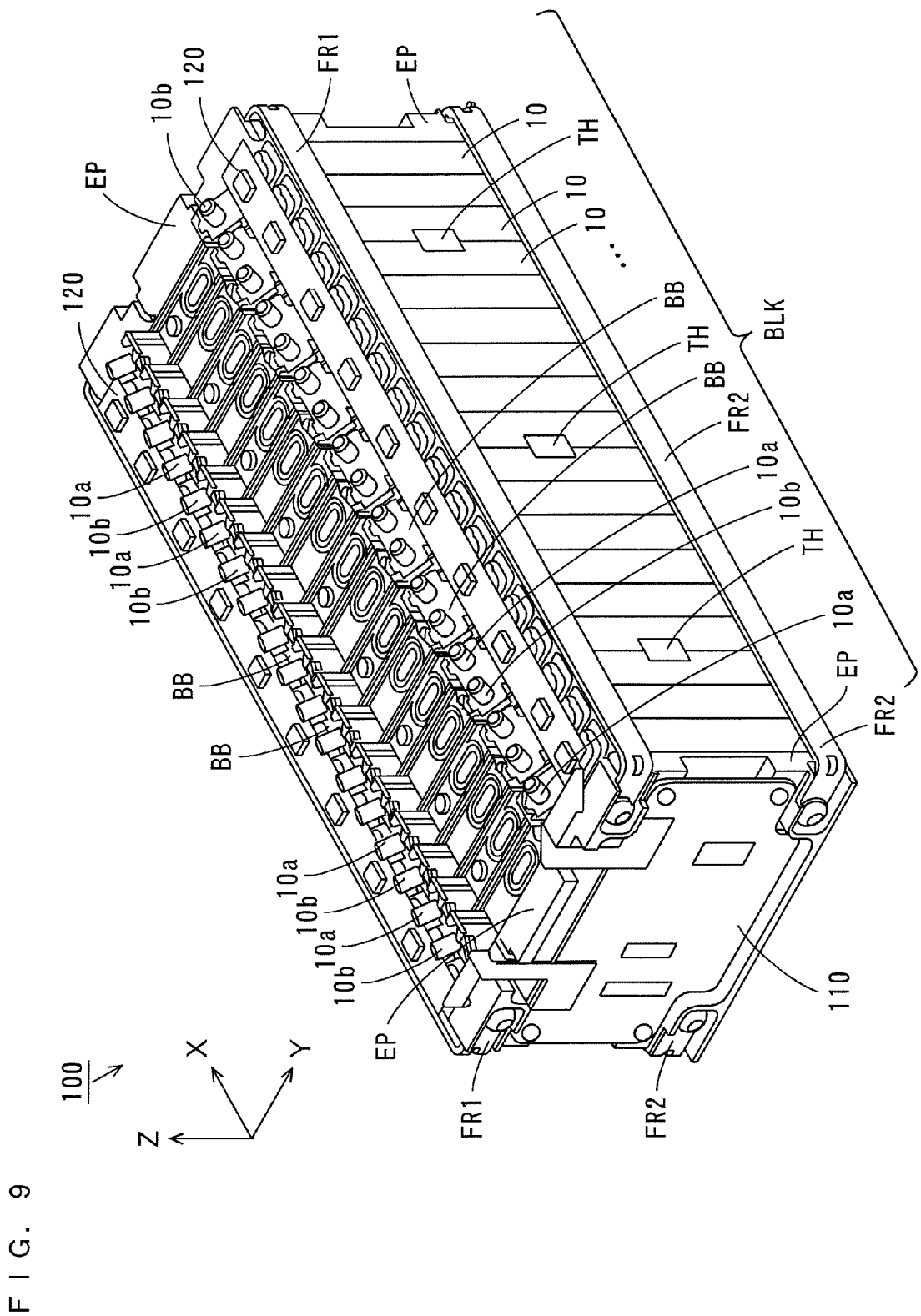
FIG. 9 is an external perspective view illustrating an example of a battery module.

A configuration of the battery module 100 will be described. FIG. 9 is an external perspective view illustrating an example of the battery module 100. In FIG. 9, three directions that are perpendicular to one another are respectively defined as an X-direction, a Y-direction, and a Z-direction, as indicated by arrows X, Y, and Z. In this example, the X-direction and the Y-direction are directions parallel to a horizontal plane, and the Z-direction is a direction perpendicular to the horizontal plane. An upward direction is a direction of the arrow Z.

As illustrated in FIG. 9, in the battery module 100, a plurality of flat battery cells 10 having a substantially rectangular parallelepiped shape are arranged to line up in the X-direction. A pair of end surface frames EP having a substantially plate shape is arranged parallel to a Y-Z plane. A pair of upper end frames FR1 and a pair of lower end frames FE2 are arranged to extend in the X-direction. Connectors for connecting the pair of upper end frames FR1 and the pair of lower end frames FR2 are respectively formed at four corners of the pair of end surface frames EP. While the plurality of battery cells 10 are arranged between the pair of end surface frames EP, the pair of upper end frames FR1 is attached to the connectors on the upper side of the pair of end surface frames EP, and the pair of lower end frames FR2 is attached to the connectors on the lower side of the pair of end surface frames EP. Thus, the pair of end surface frames EP, the pair of upper end frames FR1, and the pair of lower end frames FR2 integrally fix the plurality of battery cells 10. The plurality of battery cells 10, the pair of end surface frames EP, the pair of upper end frames FR1, and the pair of lower end frames FR2 constitute a battery block BLK having a substantially rectangular parallelepiped shape. The battery block BLK includes a battery cell group BL illustrated in FIG. 1.

A printed circuit board 110 is attached to the one end surface frame EP. The plurality of thermistors TH, which detect the temperature of the battery module 100, are attached to a side surface of the battery block BLK.

Each of the battery cells 10 has a positive electrode 10a and a negative electrode 10b on an upper surface of the battery block BLK to line up in the Y-direction. In the battery module 100, the battery cells 10 are arranged so that a positional relationship between the positive electrode 10a and the negative electrode 10b in the Y-direction of one of the battery cells 10 is opposite to that of the adjacent battery cell 10. The electrodes 10a and 10b at respective one ends in the Y-direction of the plurality of battery cells 10 line up in the X-direction, and the electrodes 10a and 10b at the respective other ends in the Y-direction of the plurality of battery cells line up in the X-direction.

Thus, the positive electrode 10a of one of the two adjacent battery cells 10 and the negative electrode 10b of the other battery cell 10 are in close proximity to each other, and the negative electrode 10b of one of the battery cells 10 and the positive electrode 10a of the other battery cell 10 are in close proximity to each other. In this state, a bus bar BB composed of copper, for example, is attached to the two electrodes 10a and 10b in close proximity to each other. Thus, the plurality of battery cells 10 are connected in series.

A long flexible printed circuit board (hereinafter abbreviated as an FPC board) 120 extending in the X-direction 120 is common and connected to a plurality of bus bars BB at the respective one ends in the Y-direction of the plurality of battery cells 10. Similarly, a long FPC board 120 extending in the X-direction is common and connected to the plurality of bus bars BB at the respective other ends in the Y-direction of the plurality of battery cells 10.

The FPC board 120 mainly has a configuration in which a plurality of conductor lines W1 illustrated in FIG. 2, described below, are formed on an insulating layer, and have bendability and flexibility. A material for the insulating layer composing the FPC board 120 includes polyimide, and a material for the conductor line W1 includes copper. Each of the FPC boards 120 is folded at right angles inward and further folded downward at an upper end portion of one of the end surface frames EP in the battery cell group BL, and is connected to the printed circuit board 110. Thus, the voltage detector 20, the state detector 30, and the cell-voltage-balancing circuit 70 illustrated in FIG. 1 are connected to the positive electrode 10a and the negative electrode 10b of the battery cell 10.

[6] Electric Vehicle (1) Configuration and Operation

An electric vehicle will be described. The electric vehicle includes the battery system 500 according to the above-mentioned embodiment. An electric automobile will be described below as an example of the electric vehicle.

Figure 10:
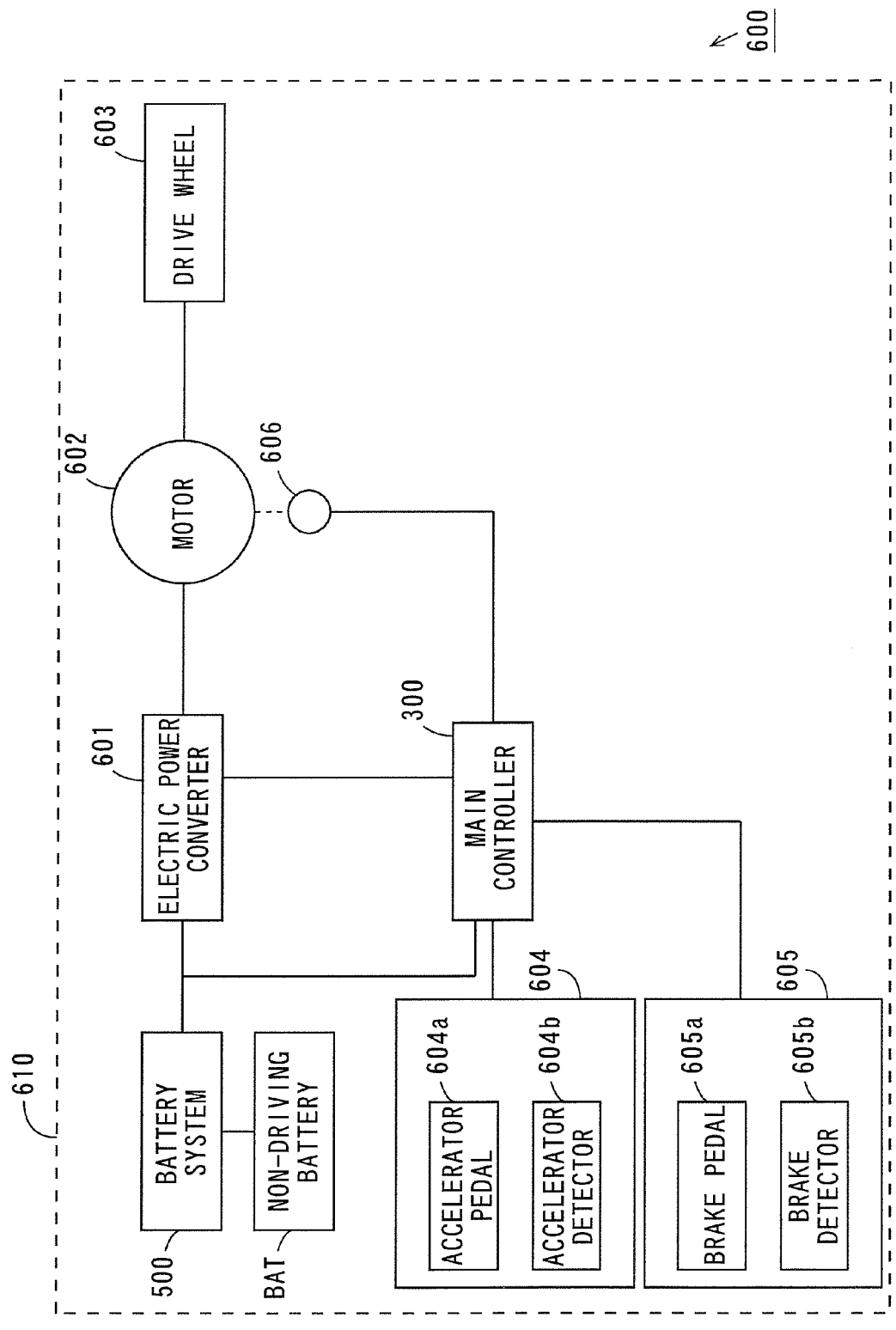
FIG. 10 is a block diagram illustrating a configuration of an electric automobile including a battery system.

FIG. 10 is a block diagram illustrating a configuration of an electric automobile including the battery system 500. As illustrated in FIG. 10, an electric automobile 600 includes a vehicle body 610. The vehicle body 610 includes the battery system 500 illustrated in FIG. 1, and a non-driving battery BAT, an electric power converter 601, a motor 602, a driving wheel 603, an accelerator device 604, a brake device 605, a rotational speed sensor 606, and a main controller 300. If the motor 602 is an alternating current (AC) motor, the electric power converter 601 includes an inverter circuit. The battery system 500 includes the battery ECU 510 illustrated in FIG. 1.

The battery system 500 is connected to the motor 602 via the electric power converter 601 while being connected to the main controller 300.

An SOC of the battery module 100 (see FIG. 1) is given to the main controller 300 from the battery ECU 510 in the battery system 500. The accelerator device 604, the brake device 605, and the rotational speed sensor 606 are connected to the main controller 300. The main controller 300 includes a CPU and a memory, or a microcomputer, for example.

The accelerator device 604 includes an accelerator pedal 604a and an accelerator detector 604b that detects an operation amount (depression amount) of the accelerator pedal 604a, which are included in the electric automobile 600. When a user operates the accelerator pedal 604a, the accelerator detector 604b detects the operation amount of the accelerator pedal 604a using a state where the accelerator pedal is not operated by the user as a basis. The detected operation amount of the accelerator pedal 604a is given to the main controller 300.

The brake device 605 includes a brake pedal 605a and a brake detector 605b that detects an operation amount (depression amount) of the brake pedal 605a by the user, which are included in the electric automobile 600. When the user operates the brake pedal 605a, the brake detector 605b detects the operation amount of the brake pedal 605a. The detected operation amount of the brake pedal 605a is given to the main controller 300. The rotational speed sensor 606 detects a rotational speed of the motor 602. The detected rotational speed is given to the main controller 300.

As described above, the SOC of the battery module 100, the operation amount of the accelerator pedal 604a, the operation amount of the brake pedal 605a, and the rotational speed of the motor 602 are given to the main controller 300. The main controller 300 performs charge/discharge control of the battery module 100 and electric power conversion control of the electric power converter 601 based on the information. When the electric automobile 600 is started and accelerated based on an accelerator operation, for example, electric power of the battery module 100 is supplied from the battery system 500 to the electric power converter 601.

The main controller 300 calculates a torque (a command torque) to be transmitted to the driving wheel 603 based on the given operation amount of the accelerator pedal 604a, and feeds a control signal based on the command torque to the electric power converter 601.

The electric power converter 601, which has received the above-mentioned control signal, converts the electric power supplied from the battery system 500 into electric power required to drive the driving wheel 603 (driving electric power). Thus, the driving electric power obtained in the conversion by the electric power converter 601 is supplied to the motor 602, and a torque generated by the motor 602 based on the driving electric power is transmitted to the driving wheel 603.

On the other hand, when the electric automobile 600 is decelerated based on a braking operation, the motor 602 functions as a power generation device. In this case, the electric power converter 601 converts regenerated electric power generated by the motor 602 into electric power suited to charge the plurality of battery cells 10, and feeds the electric power to the plurality of battery cells 10. Thus, the plurality of battery cells 10 are charged.

(2) Effects

The motor 602 is driven with the electric power from the battery system 500. The driving wheel 603 rotates with the torque generated by the motor 602 so that the electric automobile 600 serving as the electric vehicle moves.

In the electric automobile 600, the battery system 500 according to the above-mentioned embodiment is provided. This can improve the reliability of the electric automobile 600 while suppressing an increase in cost of the electric automobile 600.

The main controller 300 may have a function of the battery ECU 510. In this case, the main controller 300 is connected to the respective communication drivers 60a and 60b (see FIG. 1) in the battery modules 100a and 100b included in each of the battery systems 500 via the bus BS. In the second to fourth embodiments, the main controller 300 is further connected to the state detector 30b (see FIG. 1) in the battery module 100b included in each of the battery systems 500 via the signal line P2. If the main controller 300 has the function of the battery ECU 510, each of the battery systems 500 need not be provided with the battery ECU 510.

(3) Another Movable Body

While an example in which the battery system 500 illustrated in FIG. 1 is loaded in the electric vehicle has been described above, the battery system 500 may be loaded in another movable body such as a ship, an airplane, an elevator, or a walking robot.

The ship, which is loaded with the battery system 500, includes a hull instead of the vehicle body 610 illustrated in FIG. 10, includes a screw instead of the driving wheel 603, includes an acceleration inputter instead of the accelerator device 604, and includes a deceleration inputter instead of the brake device 605, for example. A driver operates the acceleration inputter instead of the accelerator device 604 in accelerating the hull, and operates the deceleration inputter instead of the brake device 605 in decelerating the hull. In this case, the hull corresponds to a main body, the motor corresponds to a power source, and the screw corresponds to a driving unit. In such a configuration, the motor receives electric power from the battery system 500, to convert the electric power into power, and the screw is rotated with the power so that the hull moves.

Similarly, the airplane, which is loaded with the battery system 500, includes an airframe instead of the vehicle body 610 illustrated in FIG. 10, includes a propeller instead of the driving wheel 603, includes an acceleration inputter instead of the accelerator device 604, and includes a deceleration inputter instead of the brake device 605, for example. In this case, the airframe corresponds to a main body, the motor corresponds to a power source, and the propeller corresponds to a driving unit. In such a configuration, the motor receives electric power from the battery system 500, to convert the electric power into power, and the propeller is rotated with the power so that the airframe moves.

The elevator, which is loaded with the battery system 500, includes a cage instead of the vehicle body 610 illustrated in FIG. 10, includes an hoist rope, which is attached to the cage, instead of the driving wheel 603, includes an acceleration inputter instead of the accelerator device 604, and includes a deceleration inputter instead of the brake device 605, for example. In this case, the cage corresponds to a main body, the motor corresponds to a power source, and the hoist rope corresponds to a driving unit. In such a configuration, the motor receives electric power from the battery system 500, to convert the electric power into power, and the hoist rope is wound up with the power so that the cage rises and falls.

The walking robot, which is loaded with the battery system 500, includes a body instead of the vehicle body 610 illustrated in FIG. 10, includes feet instead of the driving wheel 603, includes an acceleration inputter instead of the accelerator device 604, and includes a deceleration inputter instead of the brake device 605, for example. In this case, the body corresponds to a movable body, the motor corresponds to a power source, and the feet correspond to a driving unit. In such a configuration, the motor receives electric power from the battery system 500, to convert the electric power into power, and the feet are driven with the power so that the body moves.

Thus, the power source converts the electric power from the battery system 500 into the power, and the main body moves with the power. In the movable body, which is loaded with the battery system 500, the power source receives the electric power from the battery system 500, to convert the electric power into power, and the driving unit moves the main body with the power obtained in the conversion by the power source.

[7] Power Supply Device (1) Configuration and Operation

Figure 11:
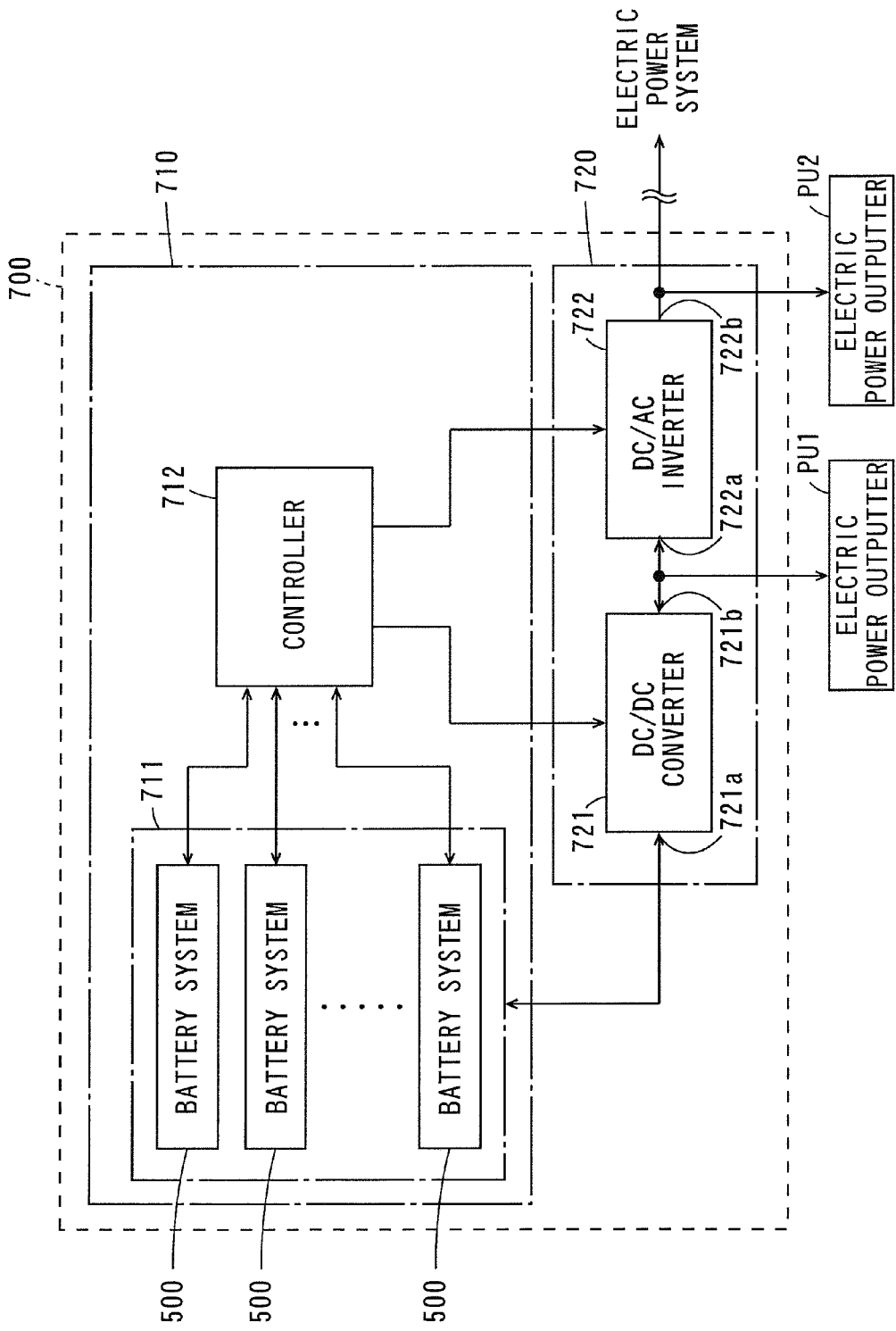
FIG. 11 is a block diagram illustrating a configuration of a power supply device.

A power supply device will be described. FIG. 11 is a block diagram illustrating a configuration of the power supply device. As illustrated in FIG. 11, the power supply device 700 includes a power storage device 710 and an electric power conversion device 720. The power storage device 710 includes a battery system group 711 and a controller 712. The battery system group 711 includes a plurality of battery systems 500. The plurality of battery systems 500 may be connected to each other in parallel, or may be connected to each other in series.

The controller 712 includes a CPU and a memory, or a microcomputer, for example. The controller 712 is connected to the battery ECU 510 (see FIG. 1) included in each of the battery systems 500. The controller 712 controls the electric power conversion device 720 based on an SOC of each of battery cells 10, which has been given from the battery ECU 510. The controller 712 performs control, described below, as control relating to discharge or charge of the battery module 100 in the battery system 500.

The electric power conversion device 720 includes a DC/DC (direct current/direct current) converter 721 and a DC/AC (direct current/alternating current) inverter 722. The DC/DC converter 721 has input/output terminals 721a and 721b, and the DC/AC inverter 722 has input/output terminals 722a and 722b. The input/output terminal 721a of the DC/DC converter 721 is connected to the battery system group 711 in the power storage device 710 via an HV connector 530 (see FIG. 1) in each of the battery systems 500.

The input/output terminal 721b of the DC/DC converter 721 and the input/output terminal 722a of the DC/AC inverter 722 are connected to each other while being connected to an electric power outputter PU1. The input/output terminal 722b of the DC/AC inverter 722 is connected to an electric power outputter PU2 while being connected to another electric power system.

Each of the electric power outputters PU1 and PU2 has an outlet, for example. Various loads, for example, are connected to the power outputters PU1 and PU2. The other electric power system includes a commercial power supply or a solar battery, for example. The power outputters PU1 and PU2 and the other electric power system are examples of external objects connected to the power supply device. If the solar battery is used as the electric power system, the solar battery is connected to the input/output terminal 721b of the DC/DC converter 721. On the other hand, if a solar power generation system including the solar battery is used as the electric power system, an AC outputter of a power conditioner in the solar power generation system is connected to the input/output terminal 722b of the DC/AC inverter 722.

The controller 712 controls the DC/DC converter 721 and the DC/AC inverter 722 so that the battery system group 711 is discharged and charged. When the battery system group 711 is discharged, the DC/DC converter 721 performs DC/DC (direct current/direct current) conversion of electric power fed from the battery system group 711, and the DC/AC inverter 722 further performs DC/AC (direct current/alternating current) conversion thereof.

If the power supply device 700 is used as a DC power supply, electric power obtained in the DC/DC conversion by the DC/DC converter 721 is supplied to the power outputters PU1. If the power supply device 700 is used as an AC power supply, electric power obtained in the DC/AC conversion by the DC/AC inverter 722 is supplied to the power outputter PU2. AC electric power obtained in the conversion by the DC/AC converter 722 can also be supplied to another electric power system.

The controller 712 performs the following control as an example of control relating to discharge of the battery module 100 in the battery system group 711. When the battery system group 711 is discharged, the controller 712 determines whether the discharge of the battery system group 711 is stopped or whether a discharging current (or discharging electric power) is restricted based on the calculated SOC, and controls the electric power conversion device 720 based on a determination result. More specifically, when an SOC of any one of the plurality of battery cells 10 (see FIG. 1) included in the battery system group 711 becomes smaller than a predetermined threshold value, the controller 712 controls the DC/DC converter 721 and the DC/AC inverter 722 so that the discharge of the battery system group 711 is stopped or the discharging current (or the discharging electric power) is restricted. Thus, each of the battery cells 10 is prevented from being overdischarged.

The discharging current (or the discharging electric power) is restricted when a voltage of the battery system group 711 becomes a predetermined reference voltage. The controller 712 sets the reference voltage based on the SOC of the battery cell 10.

On the other hand, when the battery system group 711 is charged, the DC/AC inverter 722 performs AC/DC (alternating current/direct current) conversion of AC electric power fed from another electric power system, and the DC/DC converter 721 further performs DC/DC (direct current/direct current) conversion thereof. Electric power is fed from the DC/DC converter 721 to the battery system group 711 so that the plurality of battery cells 10 (see FIG. 1) included in the battery system group 711 are charged.

The controller 712 performs the following control as an example of control relating to charge of the battery module 100 in the battery system group 711. When the battery system group 711 is charged, the controller 712 determines whether the charge of the battery system group 711 is stopped or whether a charging current (or charging electric power) is restricted based on the calculated SOC, and controls the electric power conversion device 720 based on a determination result. More specifically, when an SOC of any one of the plurality of battery cells 10 (see FIG. 1) included in the battery system group 711 becomes larger than a predetermined threshold value, the controller 712 controls the DC/DC converter 721 and the DC/AC inverter 722 so that the charge of the battery system group 711 is stopped or the charging current (or the charging electric power) is restricted. Thus, each of the battery cells 10 is prevented from being overcharged.

The charging current (or the charging electric power) is restricted when a voltage of the battery system group 711 becomes a predetermined reference voltage. The controller 712 sets the reference voltage based on the SOC of the battery cell 10.

If electric power can be supplied between the power supply device 700 and the external object, the electric power conversion device 720 may have only either one of the DC/DC converter 721 and the DC/AC inverter 722. If electric power can be supplied between the power supply device 700 and the external object, the electric power conversion device 720 need not be provided.

(2) Effects

In the power storage device 710, the controller 712 serving as a system controller performs control relating to charge or discharge of the battery modules 100*a* and 100*b* in the above-mentioned battery system 500. Thus, the battery modules 100*a* and 100*b* can be prevented from being deteriorated, overdischarged, and overcharged.

In the power supply device 700, the electric power conversion device 720 performs electric power conversion between the battery system 500 and the external object. The electric power conversion device 720 performs control relating to charge or discharge of the battery modules 100*a* and 100*b* in the power storage device 710. More specifically, the controller 712 controls supply of electric power between the battery system group 711 and the external object. Thus, each of the battery cells 10 in the battery modules 100*a* and 100*b* included in the battery system group 711 is prevented from being overdischarged and overcharged.

In the power supply device 700, the battery system 500 according to the above-mentioned embodiment is provided. This can improve the reliability of the power supply device 700 while suppressing an increase in cost of the power supply device 700.

The controller 712 controls the electric power conversion device 720 if it detects an abnormality in a terminal voltage in the battery cell group BL. Therefore, each of the battery systems 500 need not be provided with the contactor 520 illustrated in FIG. 1.

The controller 712 may have a function of the battery ECU 510. In this case, the controller 712 is connected to respective communication drivers 60*a* and 60*b* (see FIG. 1) in the battery modules 100*a* and 100*b* included in each of the battery systems 500 via the bus BS. In the second to fourth embodiments, the controller 712 is further connected to the state detector 30*b* (see FIG. 1) in the battery module 100*b* included in each of the battery systems 500 via the signal line P3. If the controller 712 has the function of the battery ECU 510, each of the battery systems 500 need not be provided with the battery ECU 510.

[8] Other Embodiments (1) While in the above-mentioned embodiments, the state detector 30 generates an "H"-level detection signal, for example, at the time of abnormality detection, and generates an "L"-level detection signal, for example, at the time of normality detection, the present invention is not limited to this. The state detector 30 may generate a detection signal, described below.

The state detector 30 generates a detection signal having a first duty ratio (e.g., 75%) if a terminal voltage of at least one of battery cells 10 in a corresponding battery cell group BL is an upper-limit voltage or more (at the time of first abnormality detection). The state detector 30 generates a detection signal having a second duty ratio (e.g., 25%) when the terminal voltage of at least one of the battery cells 10 in the corresponding battery cell group BL is a lower-limit voltage or less (at the time of second abnormality detection). The state detector 30 generates a detection signal having a third duty ratio (e.g., 50%) at the time of normality detection.

If a short circuit to ground level occurs, the detection signal reaches an "L" level. On the other hand, when a short circuit to power supply line occurs, the detection signal reaches an "H" level. "Short circuit to ground level" means a state where a signal line of a state detector DT is disconnected while contacting a ground terminal or the like so that the signal line is retained at a ground potential. "Short circuit to power supply line" means a state where the signal line of the state detector DT is disconnected while contacting a power supply terminal or the like so that the signal line is retained at a power supply potential. Therefore, a state detector 30, an operation processing device 40, and a battery ECU 510 receive an "L"-level detection signal when the short circuit to ground level occurs, and receive an "H"-level detection signal when the short circuit to power supply line occurs.

The battery ECU 510 can detect the occurrences of the first and second abnormalities, the normality, the short circuit to ground level, and the short circuit to power supply line of the battery cells 10 by receiving detection signals respectively having the above-mentioned first to third duty ratios and the "L"-level detection signal and the "H"-level detection signal.

(2) While the state detector 30 detects an abnormal state and a normal state relating to charge and discharge of the battery cell group BL, and generates a detection signal representing an abnormality or a normality in the above-mentioned embodiments, the present invention is not limited to this. The state detector 30 may detect only an abnormal state relating to charge and discharge of the battery cell group BL, and generate a detection signal representing only an abnormality. The state detector 30 may detect only a normal state relating to charge and discharge of the battery cell group BL, and generate a detection signal representing only a normality.

(3) While the battery module 100 includes the plurality of battery cells 10 in the above-mentioned embodiments, the present invention is not limited to this. The battery module 100 may include one battery cell 10.

(4) While the detection signal DT1 generated by the state detector 30*a* in the battery module 100*a* is fed to at least one of the state detector 30*b* and the operation processing device 40*b* in the battery module 100*b* without passing through the operation processing device 40*a* in the above-mentioned embodiments, the present invention is not limited to this. The detection signal DT1 generated by the state detector 30*a* in the battery module 100*a* may be fed to at least one of the state detector 30*b* and the operation processing device 40*b* in the battery module 100*b* by passing through the operation processing device 40*a*.

Similarly, the detection signal DT2 generated by the state detector 30*b* in the battery module 100*b* may be fed to at least one of the state detector 30*a* and the operation processing device 40*a* via the operation processing device 40*b*.

Figure 12:
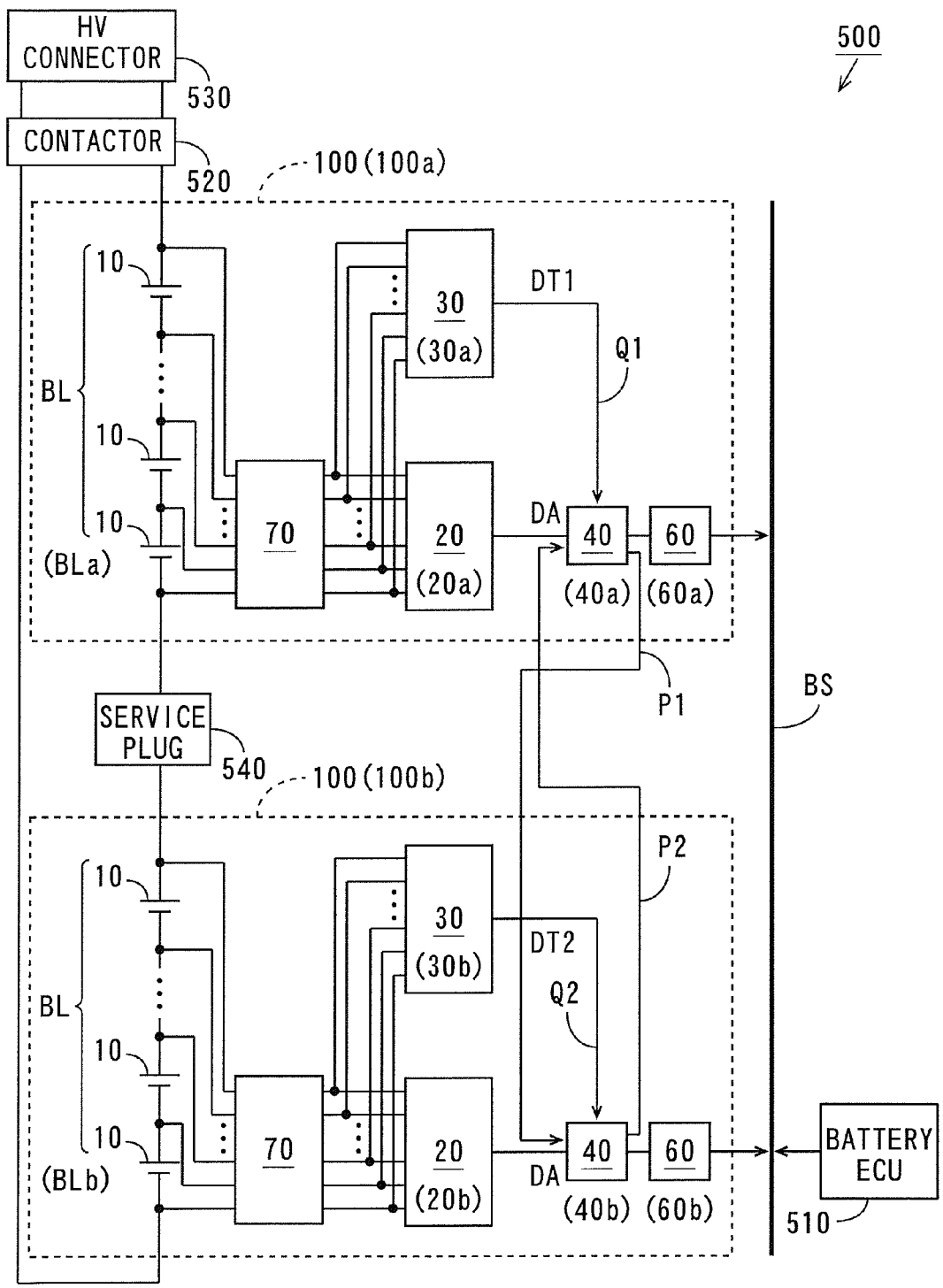
FIG. 12 is a block diagram illustrating a configuration of a battery system according to a first modified example.

FIG. 12 is a block diagram illustrating a configuration of a battery system 500 according to a first modified example. As illustrated in FIG. 12, a detection signal DT1 generated by a state detector 30*a* in a battery module 100*a* is fed to a corresponding operation processing device 40*a* via a connection line Q1 while being fed to an operation processing device 40*b* in a battery module 100*b* via the connection line Q1, the operation processing device 40*a*, and a signal line P1.

A detection signal DT2 generated by a state detector 30*b* in the battery module 100*b* is fed to the corresponding operation processing device 40*b* via a connection line Q2 while being fed to the operation processing device 40*a* in the battery module 100*a* via the connection line Q2, the operation processing device 40*b*, and a signal line P2.

More specifically, the detection signal DT1 generated by the state detector 30*a* is transmitted to the operation processing device 40*a* via the connection line Q1 serving as a second communication path while being transmitted to the operation processing device 40*b* via the connection line Q1 and the signal line P1 serving as a first communication path. The detection signal DT2 generated by the state detector 30*b* is transmitted to the operation processing device 40*b* via the connection line Q2 serving as a fifth communication path while being transmitted to the operation processing device 40a via the connection line Q2 and the signal line P2 serving as a fourth communication path.

The detection signal DT1 generated by the state detector 30a in the battery module 100a may be fed to the state detector 30b in the battery module 100b via the connection line Q1, the operation processing device 40a, and the signal line P1. The detection signal DT1 generated by the state detector 30a in the battery module 100a may be fed to the operation processing device 40b in the battery module 100b via the connection line Q1, the operation processing device 40a, and the signal line P1, and further fed to the operation processing device 40b in the battery module 100b via the connection line Q1, the operation processing device 40a, and another signal line.

The detection signal DT2 generated by the state detector 30b in the battery module 100b may be fed to the state detector 30a in the battery module 100a via the connection line Q2, the operation processing device 40b, and the signal line P2. The detection signal DT2 generated by the state detector 30b in the battery module 100b may be fed to the operation processing device 40a in the battery module 100a via the connection line Q2, the operation processing device 40b, and the signal line P2, and further fed to the operation processing device 40a in the battery module 100a via the connection line Q2, the operation processing device 40b, and another signal line.

Each of the operation processing devices 40a and 40b includes a plurality of communication terminals conforming to standards such as CAN, UART (Universal Asynchronous Receiver Transmitter), I²C (inter-Integrated Circuit), LIN (Local Interconnect Network), and Ethernet (registered trademark). Therefore, the operation processing devices 40a and 40b are easily connected to the plurality of communication terminals.

Thus, the state detector 30a in the battery module 100a can easily feed the detection signal DT1 to the state detector 30b and the operation processing device 40b in the battery module 100b via a plurality of communication terminals of the operation processing device 40a. Similarly, the state detector 30b in the battery module 100b can easily feed the detection signal DT2 to the state detector 30a and the operation processing device 40a in the battery module 100a via a plurality of communication terminals of the operation processing device 40b.

(5) While the battery system 500 includes the two battery modules 100a and 100b in the above-mentioned embodiments, the present invention is not limited to this. The battery system 500 may include three or more battery modules 100.

Figure 13:
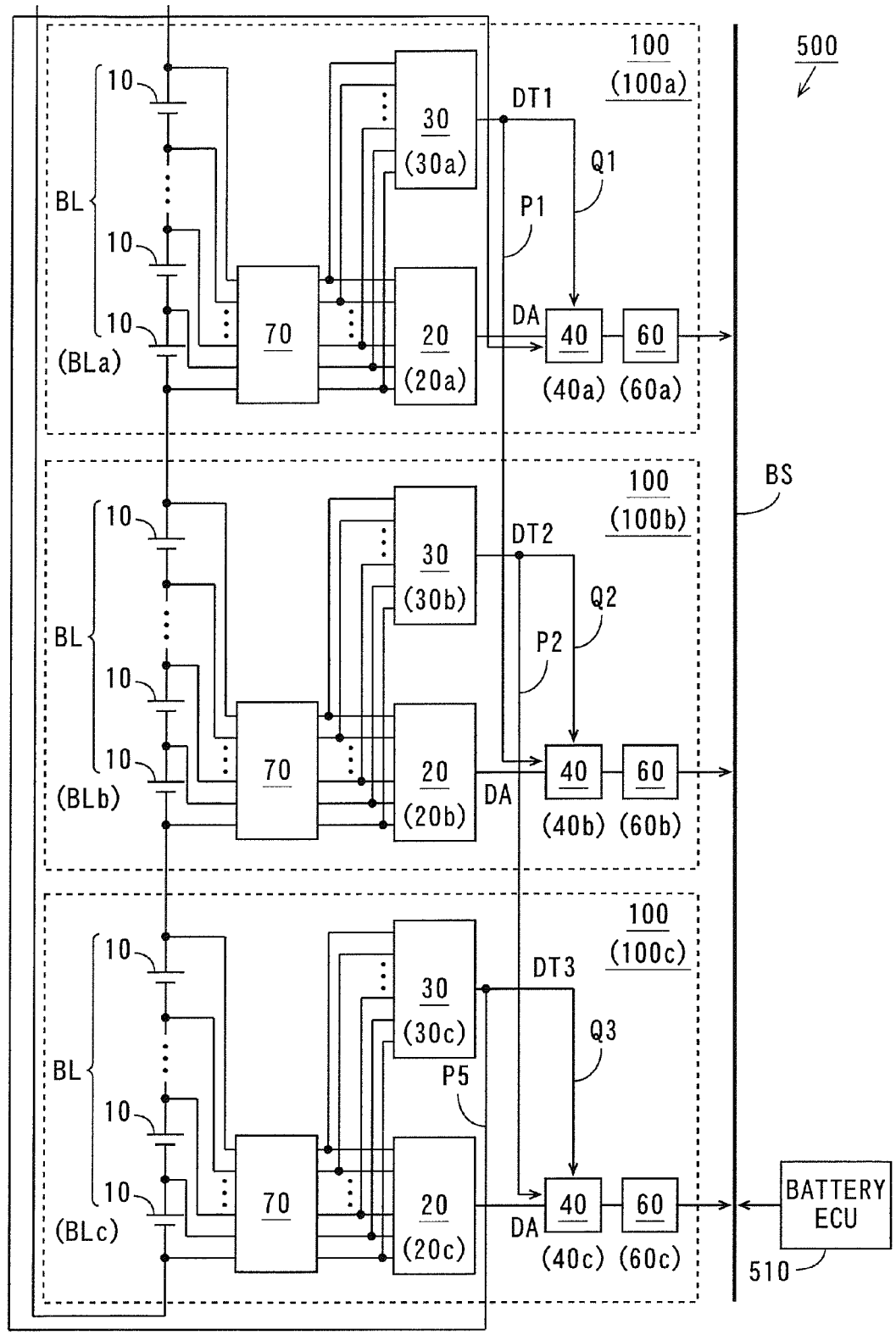
FIG. 13 is a block diagram illustrating a configuration of a battery system according to a second modified example.

FIG. 13 is a block diagram illustrating a configuration of a battery system 500 according to a second modified example. As illustrated in FIG. 13, the battery system 500 further includes a battery module 100c serving as a 1st third battery module in addition to a battery module 100a serving as a first battery module and a battery module 100b serving as a second battery module. More specifically, the battery system 500 includes a first battery module, a second battery module, and N third battery modules. N is one in the second modified example.

A configuration of the battery module 100c is similar to configurations of the battery modules 100a and 100b. A battery cell group BL, a voltage detector 20, a state detector 30, an operation processing device 40, and a communication driver 60 in the battery module 100c are respectively referred to as a battery cell group BLc, a voltage detector 20c, a state detector 30c, an operation processing device 40c, and a communication driver 60c. In FIG. 13, illustration of the contactor 520, the HV connector 530, and the service plug 540 illustrated in FIG. 1 is omitted.

A state detector 30a in the battery module 100a detects the presence or absence of an abnormality in a terminal voltage of each of a plurality of battery cells 10 in a corresponding battery cell group BLa, and generates a detection signal DT1 representing its detection result. The detection signal DT1 generated by the state detector 30a in the battery module 100a is fed to a corresponding operation processing device 40a via a connection line Q1 while being fed to an operation processing device 40b in the battery module 100b via a signal line P1.

A state detector 30b in the battery module 100b detects the presence or absence of an abnormality in a terminal voltage of each of a plurality of battery cells 10 in a corresponding battery cell group BLb, and generates a detection signal DT2 representing its detection result. The detection signal DT2 generated by the state detector 30b in the battery module 100b is fed to the corresponding operation processing device 40b via a connection line Q2 while being fed to the operation processing device 40c in the battery module 100c via a signal line P2.

The state detector 30c in the battery module 100c detects the presence or absence of an abnormality in a terminal voltage of each of a plurality of battery cells 10 in the corresponding battery cell group BLc, and generates a detection signal DT3 representing its detection result. The detection signal DT3 generated by the state detector 30c in the battery module 100c is fed to the corresponding operation processing device 40a via a connection line Q3 while being fed to an operation processing device 40a in the battery module 100a via a signal line P5.

More specifically, the state detector 30c serving as a third state detector generates the detection signal DT3 serving as a third detection signal when it detects an abnormal state relating to charge and discharge of the battery cell group BLc serving as a third battery cell group in the battery module 100c serving as a third battery module.

The detection signal DT1 generated by the state detector 30a is transmitted to the operation processing device 40a via the connection line Q1 serving as a second communication path while being transmitted to the operation processing device 40b via a signal line P1 serving as a first communication path. The detection signal DT2 generated by the state detector 30b is transmitted to the operation processing device 40b via the connection line Q2 serving as a fifth communication path while being transmitted to the operation processing device 40c via the signal line P2 serving as an eighth communication path.

The detection signal DT3 generated by the state detector 30c in the battery module 100c may be fed to a battery ECU 510 via the signal line P5 without being fed to the operation processing device 40a in the battery module 100a via the signal line P5.

In this case, a connector CNc of a printed circuit board 110 (see FIGS. 3 and 4) in the battery module 100a and a connector CNb of a printed circuit board 110 (see FIGS. 3 and 4) in the battery module 100b are connected to each other via the signal line P1. A connector CNc of the printed circuit board 110 in the battery module 100b and a connector CNb of a printed circuit board 110 (see FIGS. 3 and 4) in the battery module 100c are connected to each other via the signal line P2. Further, a connector CNc of the printed circuit board 110 in the battery module 100c and a connector CNb of the printed circuit board 110 in the battery module 100a are connected to each other via the signal line P5.

If the detection signal DT3 generated by the state detector 30c in the battery module 100c is fed to the battery ECU 510 via the signal line P5, the connector CNc of the printed circuit board 110 in the battery module 100c and the battery ECU 510 are connected to each other via the signal line P5. In this case, a connector CNb need not be provided in the printed circuit board 110 in the battery module 100a.

In the second modified example, the detection signal DT1 generated by the state detector 30a in the battery module 100a may be fed to at least one of the state detector 30b and the operation processing device 40b in the battery module 100b via the operation processing device 40a. The detection signal DT2 generated by the state detector 30b in the battery module 100b may be fed to at least one of the state detector 30c and the operation processing device 40c in the battery module 100c via the operation processing device 40b. The detection signal DT3 generated by the state detector 30c in the battery module 100c may be fed to at least one of the state detector 30a and the operation processing device 40a in the battery module 100a via the operation processing device 40c.

Figure 14:
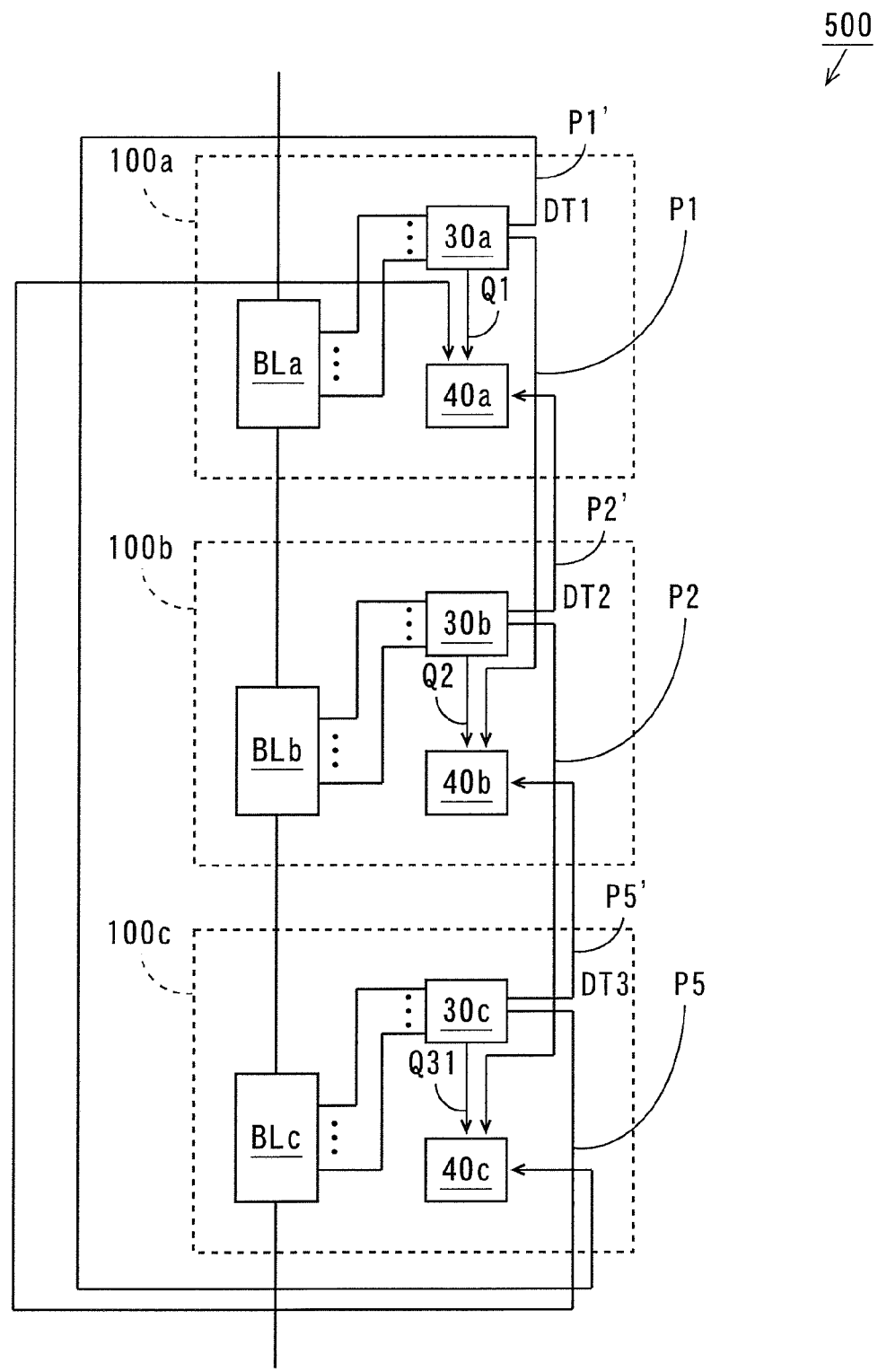
FIG. 14 is a block diagram illustrating a configuration of a battery system in another example of the second modified example.

FIG. 14 is a block diagram illustrating a configuration of a battery system 500 according to another example of the second modified example. In FIG. 14, illustration of the battery cell 10, the voltage detector 20, the communication driver 60, and the cell-voltage-balancing circuit 70 in each of battery modules 100a to 100c is omitted. Illustration of the battery ECU 510, the contactor 520, the HV connector 530, and the service plug 540 illustrated in FIG. 1 is omitted.

A detection signal DT1 generated by a state detector 30a in a battery module 100a is fed to an operation processing device 40b in a battery module 100b via a signal line P1 while being further fed to an operation processing device 40c in a battery module 100c via a signal line P1'.

A detection signal DT2 generated by a state detector 30b in a battery module 100b is fed to the operation processing device 40c in the battery module 100c via a signal line P2 while being further fed to an operation processing device 40a in the battery module 100a via a signal line P2'.

A detection signal DT3 generated by a state detector 30c in the battery module 100c is fed to the operation processing device 40a in the battery module 100a via a signal line P5 while being further fed to the operation processing device 40b in the battery module 100b via a signal line P5'.

Figure 15:
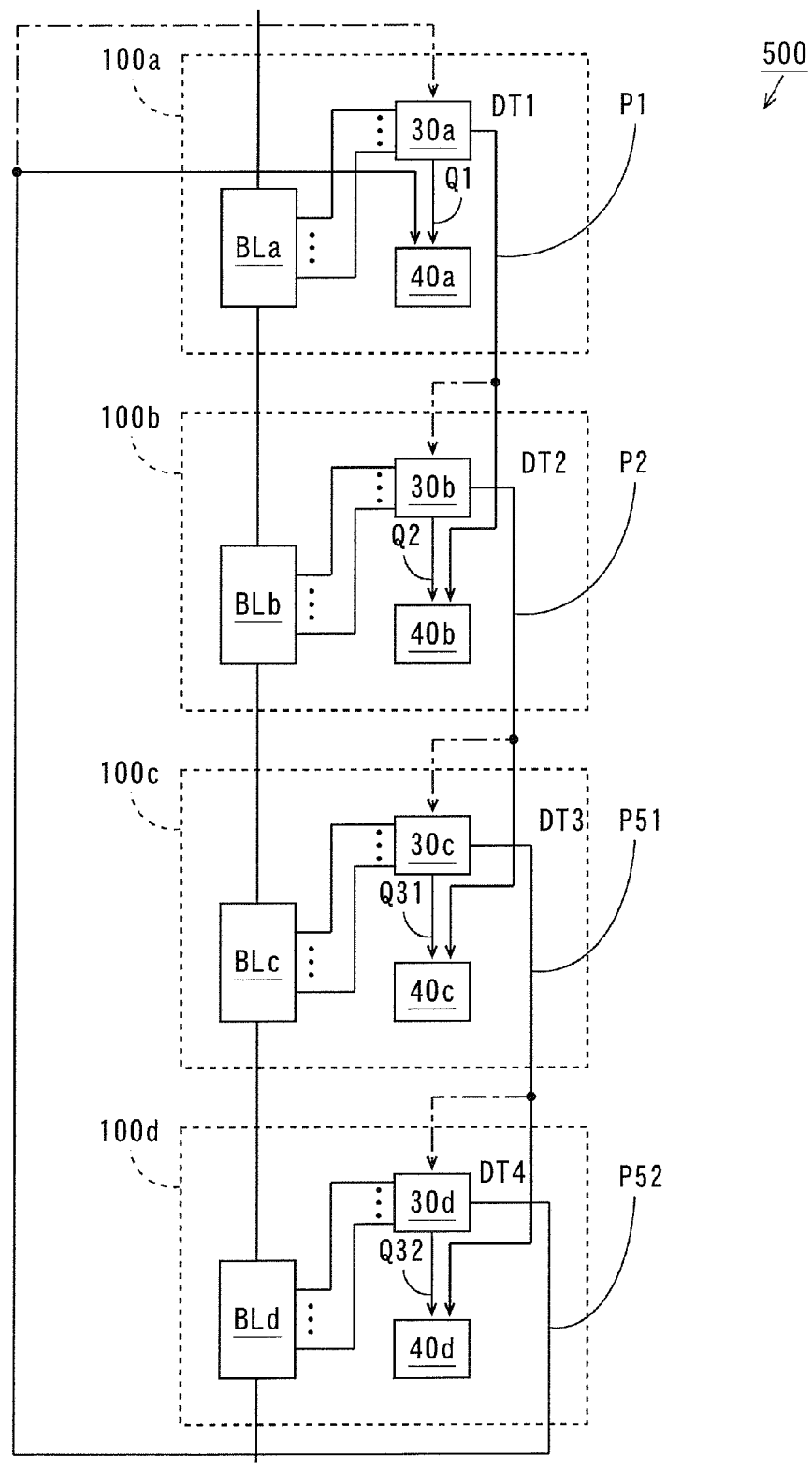
FIG. 15 is a block diagram illustrating a configuration of a battery system according to a third modified example.

FIG. 15 is a block diagram illustrating a configuration of a battery system 500 according to a third modified example. As illustrated in FIG. 15, the battery system 500 includes a battery module 100a serving as a first battery module, a battery module 100b serving as a second battery module, a battery module 100c serving as a 1st third battery module, and a battery module 100d serving as an N-th battery module. More specifically, the battery system 500 includes a first battery module, a second battery module, and N battery modules. N is two in the third modified example.

A configuration of the battery module 100d is similar to configurations of the battery modules 100a to 100c. A battery cell group BL, a state detector 30, and an operation processing device 40 in the battery module 100d are respectively referred to as a battery cell group BLd, a state detector 30d, and an operation processing device 40d. In FIG. 15, illustration of the battery cell 10, the voltage detector 20, the communication driver 60, and the cell-voltage-balancing circuit 70 in each of the battery modules 100a to 100d is omitted. Illustration of the battery ECU 510, the contactor 520, the HV connector 530, and the service plug 540 illustrated in FIG. 1 is omitted.

A state detector 30a in the battery module 100a detects the presence or absence of an abnormality in a terminal voltage of each of a plurality of battery cells 10 in a corresponding battery cell group BLa, and generates a detection signal DT1 representing its detection result. The detection signal DT1 generated by the state detector 30a in the battery module 100a is fed to a corresponding operation processing device 40a via a connection line Q1 while being fed to an operation processing device 40b in the battery module 100b via a signal line P1 serving as a first communication path. The detection signal DT1 generated by the state detector 30a in the battery module 100a may be fed to a state detector 30b, as indicated by a one-dot and dash line, without being fed to the operation processing device 40b in the battery module 100b.

The state detector 30b in the battery module 100b detects the presence or absence of an abnormality in a terminal voltage of each of a plurality of battery cells 10 in a corresponding battery cell group BLb, and generates a detection signal DT2 representing its detection result. The detection signal DT2 generated by the state detector 30b in the battery module 100b is fed to the corresponding operation processing device 40b via a connection line Q2 while being fed to an operation processing device 40c in the battery module 100c via a signal line P2 serving as an eighth communication path. The detection signal DT2 generated by the state detector 30b in the battery module 100b may be fed to a state detector 30c, as indicated by a one-dot and dash line, without being fed to the operation processing device 40c in the battery module 100c.

The state detector 30c in the battery module 100c detects the presence or absence of an abnormality in a terminal voltage of each of a plurality of battery cells 10 in a corresponding battery cell group BLc, and generates a detection signal DT3 representing its detection result. The detection signal DT3 generated by the state detector 30c in the battery module 100c is fed to the corresponding operation processing device 40c via a connection line Q31 while being fed to the operation processing device 40d in the battery module 100d via a signal line P51 serving as a 1st ninth communication path. The detection signal DT3 generated by the state detector 30c in the battery module 100c may be fed to the state detector 30d, as indicated by a one-dot and dash line, without being fed to the operation processing device 40d in the battery module 100d.

The state detector 30d in the battery module 100d detects the presence or absence of an abnormality in a terminal voltage of each of a plurality of battery cells 10 in the corresponding battery cell group BLd, and generates a detection signal DT4 representing its detection result. The detection signal DT4 generated by the state detector 30d in the battery module 100d is fed to the corresponding operation processing device 40d via a connection line Q32 while being fed to the operation processing device 40a in the battery module 100a via a signal line P52 serving as an N-th (2nd in this example) ninth communication path. The detection signal DT4 generated by the state detector 30d in the battery module 100d may be fed to the state detector 30a, as indicated by a one-dot and dash line, without being fed to the operation processing device 40a in the battery module 100a.

In the third modified example, the detection signal DT1 generated by the state detector 30a in the battery module 100a may be fed to at least one of the state detector 30b and the operation processing device 40b in the battery module 100b via the operation processing device 40a, i.e., a first communication circuit. The detection signal DT2 generated by the state detector 30b in the battery module 100b may be fed to at least one of the state detector 30c and the operation processing device 40c in the battery module 100c via the operation processing device 40b, i.e., a second communication circuit. The detection signal DT3 generated by the state detector 30c in the battery module 100c may be fed to at least one of the state detector 30d and the operation processing device 40d in the battery module 100d via the operation processing device 40c, i.e., a 1st third communication circuit. The detection signal DT4 generated by the state detector 30d in the battery module 100d may be fed to at least one of the state detector 30a and the operation processing device 40a in the battery module 100a via the operation processing device 40d, i.e., a 2nd third communication circuit.

Figure 16:
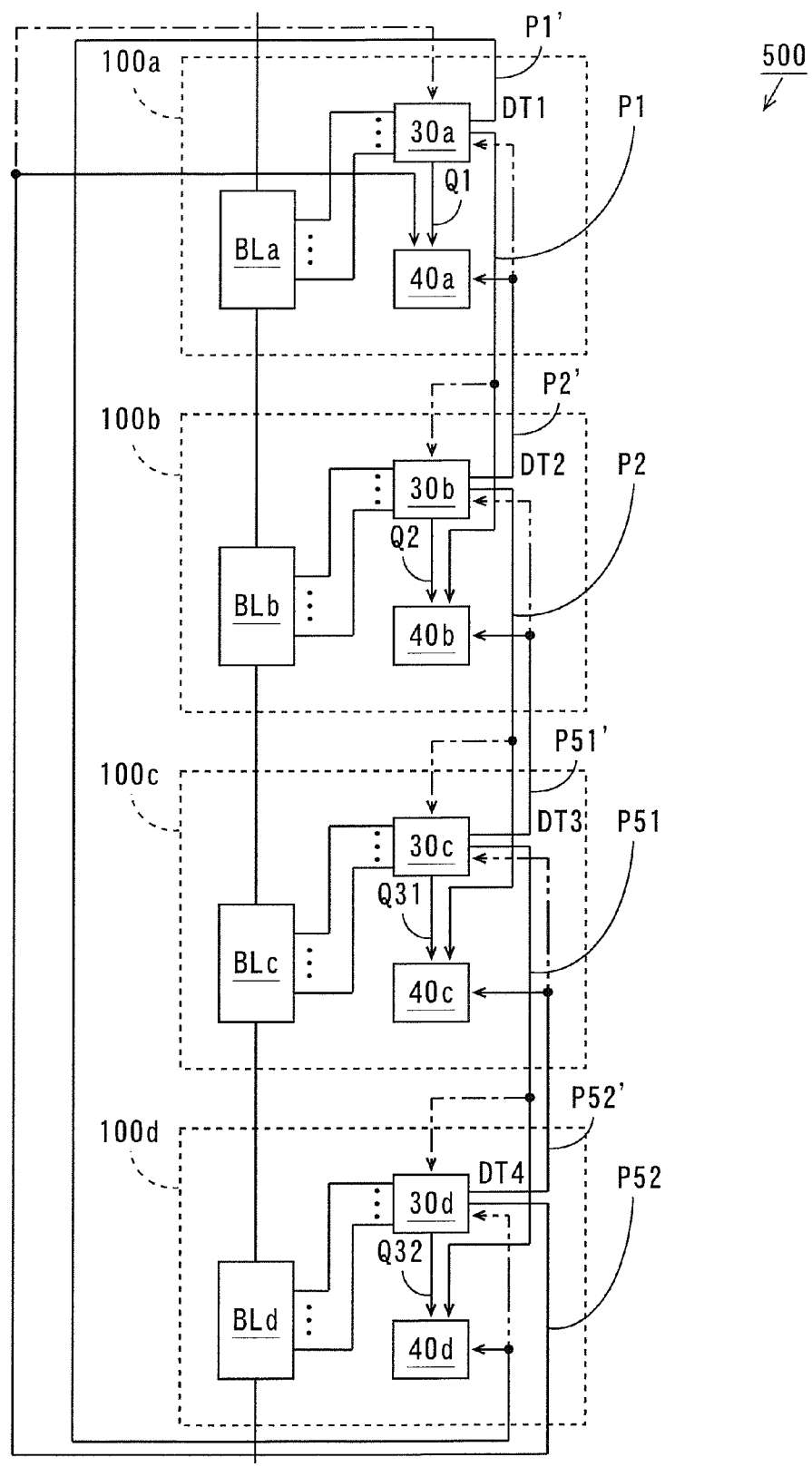
FIG. 16 is a block diagram illustrating a configuration of a battery system in another example of the third modified example.

FIG. 16 is a block diagram illustrating a configuration of a battery system 500 in another example of the third modified example. In FIG. 16, illustration of the battery cell 10, the voltage detector 20, the communication driver 60, and the cell-voltage-balancing circuit 70 in each of battery modules 100a to 100d is omitted. Illustration of the battery ECU 510, the contactor 520, the HV connector 530, and the service plug 540 illustrated in FIG. 1 is omitted.

A detection signal DT1 generated by a state detector 30a in the battery module 100a is fed to an operation processing device 40b in the battery module 100b via a signal line P1 while being further fed to an operation processing device 40d in the battery module 100d via a signal line P1'. The detection signal DT1 generated by the state detector 30a in the battery module 100a may be fed to a state detector 30d, as indicated by a two-dot and dash line, without being fed to the operation processing device 40d in the battery module 100d.

A detection signal DT2 generated by a state detector 30b in the battery module 100b is fed to an operation processing device 40c in the battery module 100c via a signal line P2 while being further fed to an operation processing device 40a in the battery module 100a via a signal line P2'. The detection signal DT2 generated by the state detector 30b in the battery module 100b may be fed to the state detector 30a, as indicated by a two-dot and dash line, without being fed to the operation processing device 40a in the battery module 100a.

A detection signal DT3 generated by a state detector 30c in the battery module 100c is fed to the operation processing device 40d in the battery module 100d via a signal line P51 while being further fed to the operation processing device 40b in the battery module 100b via a signal line P51'. The detection signal DT3 generated by the state detector 30c in the battery module 100c may be fed to the state detector 30b, as indicated by a two-dot and dash line, without being fed to the operation processing device 40b in the battery module 100b.

A detection signal DT4 generated by the state detector 30d in the battery module 100d is fed to the operation processing device 40a in the battery module 100a via a signal line P52 while being further fed to the operation processing device 40c in the battery module 100c via a signal line P52'. The detection signal DT4 generated by the state detector 30d in the battery module 100d may be fed to the state detector 30c, as indicated by a two-dot and dash line, without being fed to the operation processing device 40c in the battery module 100c.

Each of the battery systems according to the second and third modified examples further includes a tenth communication path (a signal line P1') and N (N=1 in the example illustrated in FIG. 14, N=2 in the example illustrated in FIG. 16) eleventh communication paths which are 1st to N-th eleventh communication paths (the signal lines P5' in the example illustrated in FIG. 14, the signal lines P51' and P52' in the example illustrated in FIG. 16). The tenth communication path is provided to transmit a first detection signal (the detection signal DT1) generated by a first state detector (the state detector 30a) in a first battery module (the battery module 100a) to at least one of a third communication circuit (the operation processing device 40c in the example illustrated in FIG. 14, the operation processing device 40d in the example illustrated in FIG. 16) in an N-th third battery module (the battery module 100c in the example illustrated in FIG. 14, the battery module 100d in the example illustrated in FIG. 16) and a third state detector (the state detector 30c illustrated in the example illustrated in FIG. 14, the state detector 30d in the example illustrated in FIG. 16). If N is one (a case of the example illustrated in FIG. 14), a 1st eleventh communication path (the signal line P5') is provided to transmit a third detection signal (the detection signal DT3) generated by a third state detector (the state detector 30c) in a 1st third battery module (the battery module 100c) to at least one of a second communication circuit (the operation processing device 40b) and a second state detector (the state detector 30b) in a second battery module (the battery module 100b). If N is two or more (a case of the example illustrated in FIG. 16), a j-th (j is a natural number from 2 to N) eleventh communication path (the signal line P52') is provided to transmit a third detection signal (the detection signal DT4) generated by a third state detector (the state detector 30d) in a j-th third battery module (the battery module 100d) to at least one of a third communication circuit (the operation processing device 40c) and a third state detector (the state detector 30c) in a (j−1)-th third battery module (the battery module 100c). A 1st eleventh communication path (the signal line P51') is provided to transmit a third detection signal (the detection signal DT3) generated by the third state detector (the state detector 30c) in the 1st third battery module (the battery module 100c) to at least one of the second communication circuit (the operation processing device 40b) and the second state detector (the state detector 30b) in the second battery module (the battery module 100b).

In the battery systems according to the second and third modified examples, the tenth communication path may transmit the first detection signal via the first communication circuit. Similarly, the eleventh communication path may transmit the third detection signal via the third communication circuit.

(6) While the state detectors 30a and 30b detect abnormalities in the terminal voltages of the plurality of battery cells 10 as abnormalities relating to charge and discharge of the corresponding battery cell groups BLa and BLb in the above-mentioned embodiments, the present invention is not limited to this. The state detectors 30a and 30b may detect abnormalities in currents flowing through the battery cell groups BLa and BLb, an SOC (State of Charge) of the battery cell 10, overdischarge, overcharge, or a temperature as abnormalities relating to charge and discharge of the corresponding battery cell groups BLa and BLb.

If the state detectors 30a and 30b detect the abnormalities in the currents flowing through the battery cell groups BLa and BLb as abnormalities relating to charge and discharge of the corresponding battery cell groups BLa and BLb, the battery modules 100a and 100b respectively have current detectors that detect the currents flowing through the battery cell groups BLa and BLb.

(7) While the detection signal DT2 generated by the state detector 30b in the battery module 100b is fed to the operation processing device 40a in the battery module 100a in the first embodiment, the present intention is not limited to this.

Figure 17:
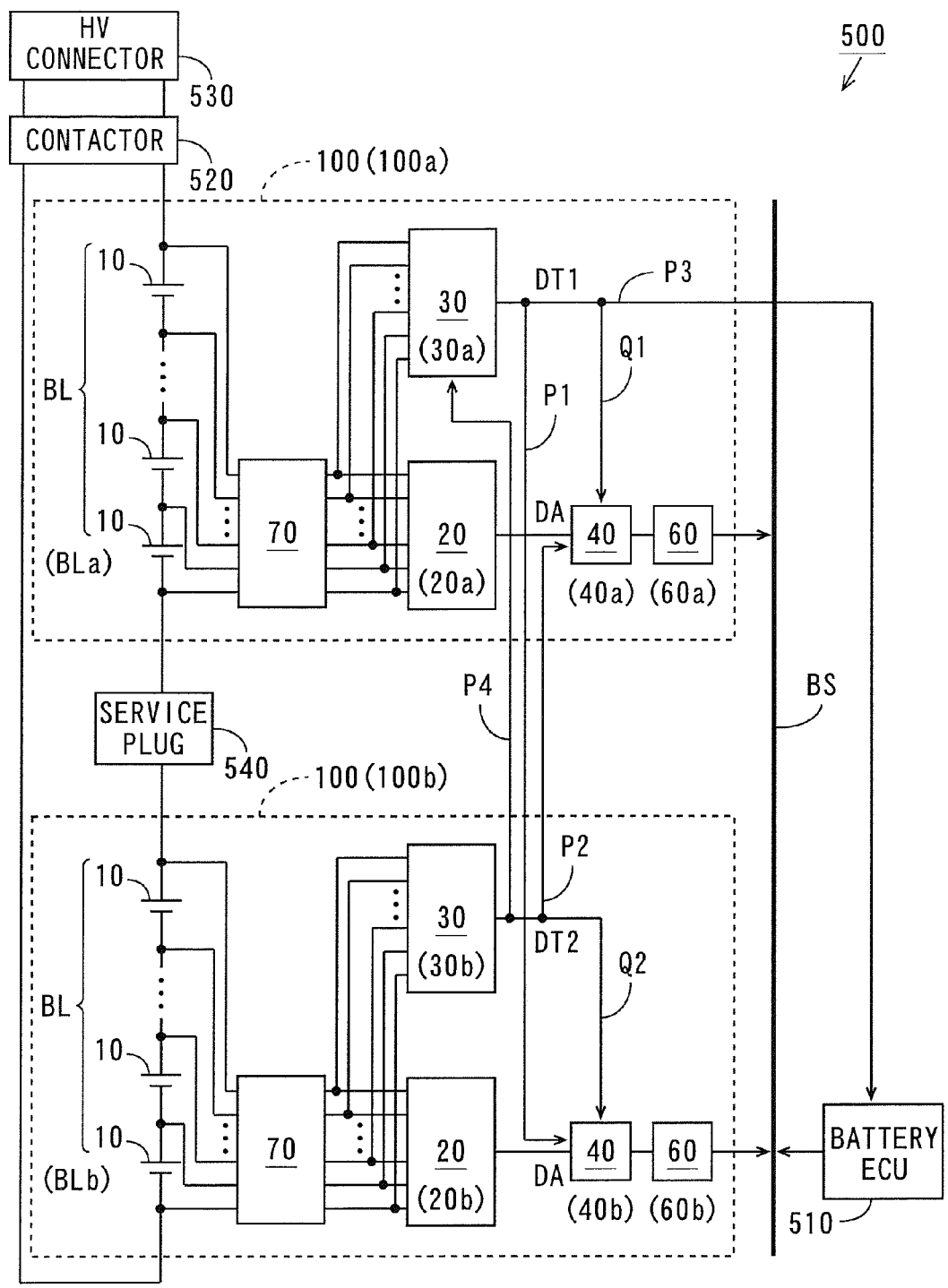
FIG. 17 is a block diagram illustrating a configuration of a battery system according to a fourth modified example.

FIG. 17 is a block diagram illustrating a configuration of a battery system 500 according to a fourth modified example. As illustrated in FIG. 17, a detection signal DT2 generated by a state detector 30b in a battery module 100b may be fed to a state detector 30a in a battery module 100a via a signal line P4. In this case, a connector CNc (see FIGS. 3 and 4) of the battery module 100b and a connector CNd (see FIGS. 3 and 4) of the battery module 100a are connected to each other via the signal line P4. According to this configuration, the detection signal DT2 is fed, as a detection signal DT1, to a battery ECU 510 from the state detector 30b in the battery module 100b via the signal line P4, the state detector 30a, an operation processing device 40a, and a communication driver 60a in the battery module 100a, and a bus BS.

The state detector 30a in the battery module 100a and the battery ECU 510 may be connected to each other via a signal line P3. In this case, the connector CNc (see FIGS. 3 and 4) of the battery module 100a and the battery ECU 510 are connected to each other via the signal line P3. According to this configuration, the detection signal DT2 is fed to the battery ECU 510 from the state detector 30b in the battery module 100b via the signal line P4, the state detector 30a in the battery module 100a, and the signal line P3.

More specifically, the detection signal DT1 generated by the state detector 30a is transmitted to the operation processing device 40a via a connection line Q1 serving as a second communication path while being transmitted to the operation processing device 40b via a signal line P1 serving as a first communication path. The detection signal DT2 generated by the state detector 30b is transmitted to the operation processing device 40b via a connection line Q2 serving as a fifth communication path while being transmitted to the operation processing device 40a via a signal line P2 serving as a fourth communication path and transmitted to the state detector 30a via the signal line P4 serving as a sixth communication path.

In the fourth modified example, the detection signal DT1 generated by the state detector 30a in the battery module 100a may be fed to the operation processing device 40b in the battery module 100b via the operation processing device 40a. The detection signal DT2 generated by the state detector 30b in the battery module 100b may be fed to the state detector 30a and the operation processing device 40a in the battery module 100a via the operation processing device 40b.

[9] Correspondences between Elements in the Claims and Parts in Embodiments

In the following paragraphs, non-limiting examples of correspondences between various elements recited in the claims below and those described above with respect to various preferred embodiments of the present invention are explained.

In the embodiments, described above, the battery module 100a is an example of a first battery module, the battery module 100b is an example of a second battery module, the battery module 100c is an example of a 1st third battery module, and the battery module 100d is an example of a 2nd third battery module. The battery cell 10 is an example of a battery cell, the battery cell group BLa is an example of a first battery cell group, a battery cell group BLb is an example of a second battery cell group, and the battery cell groups BLc and BLd are examples of a third battery cell group. The detection signal DT1 is an example of a first detection signal, the detection signal DT2 is an example of a second detection signal, and the detection signals DT3 and DT4 are examples of a third detection signal. The state detector 30a is an example of a first state detector, the state detector 30b is an example of a second state detector, and the state detectors 30c and 30d are examples of a third state detector. The operation processing device 40a is an example of a first communication circuit, the operation processing device 40b is an example of a second communication circuit, the operation processing devices 40c and 40d are examples of a third communication circuit, and the battery system 500 is an example of a battery system.

The motor 602 is an example of a motor, the driving wheel 603 is an example of a driving wheel, the electric automobile 600 is an example of an electric vehicle, the vehicle body 610, the hull of the ship, the airframe of the airplane, the cage of the elevator, or the body of the walking robot is an example of a main body. The motor 602, the driving wheel 603, the screw, the propeller, the hoist motor for the hoist rope, or the foot of the walking robot is an example of a power source, and the electric automobile 600, the ship, the airplane, the elevator, or the waling robot is an example of a movable body. The controller 712 is an example of a system controller. The electric power storage device 710 is an example of an electric power storage device, the power supply device 700 is an example of a power supply device, and the electric power conversion device 720 is an example of an electric power conversion device.

In the first embodiment (see FIG. 1), the signal line P1 is an example of a first communication path. The connection line Q1 is another example of the first communication path (an example of the second communication path). The signal line P2 is an example of a fourth communication path. The connection line Q2 is another example of the fourth communication path (an example of a fifth communication path).

In the second embodiment (see FIG. 6), the signal line P1 is an example of a first communication path. The connection line Q1 is another example of the first communication path (an example of a second communication path). The connection line Q2 is an example of a fourth communication path (an example of a fifth communication path). The signal line P2 is an example of a seventh communication path.

In the third embodiment (see FIG. 7), the signal line P1 is an example of a first communication path (an example of a third communication path). The connection line Q1 is another example of the first communication path (an example of a second communication path). The connection line Q2 is an example of a fourth communication path (an example of a fifth communication path). The signal line P2 is an example of a seventh communication path.

In the fourth embodiment (see FIG. 8), the signal line P1 is an example of a first communication path. The signal line P3 is another example of the first communication path (an example of a third communication path). The connection line Q1 is still another example of a first communication path (an example of a second communication path). The connection line Q2 is an example of a fourth communication path (an example of a fifth communication path). The signal line P2 is an example of a seventh communication path.

In the first modified example (see FIG. 12), the connection line Q1 and the signal line P1 are examples of a first communication path. The connection line Q1 is another example of the first communication path (an example of a second communication path). The connection line Q2 and the signal line P2 are examples of a fourth communication path. The connection line Q2 is another example of the fourth communication path (an example of a fifth communication path).

In the second modified example (see FIGS. 13 and 14), the signal line P1 is an example of a first communication path. The connection line Q1 is another example of the first communication path (an example of a second communication path). The signal line P2 is an example of an eighth communication path. The connection line Q2 is another example of a fourth communication path (an example of a fifth communication path). The signal line P5 is an example of a 1st ninth communication path.

In the third modified example (see FIGS. 15 and 16), the signal line P1 is an example of a first communication path. The connection line Q1 is another example of the first communication path (an example of a second communication path). The signal line P2 is an example of an eighth communication path. The connection line Q2 is another example of a fourth communication path (an example of a fifth communication path). The signal line P51 is an example of a 1st ninth communication path. The signal line P52 is an example of a 2nd ninth communication path.

In the fourth modified example (see FIG. 17), the signal line P1 is an example of a first communication path. The connection line Q1 is another example of the first communication path (an example of a second communication path). The signal line P2 is an example of a fourth communication path. The signal line P4 is another example of the fourth communication path (an example of a sixth communication path). The connection line Q2 is still another example of the fourth communication path (an example of a fifth communication path).

As each of various elements recited in the claims, various other elements having configurations or functions described in the claims can be also used.

The invention claimed is:

1. A battery system comprising:
   a first battery module;
   a second battery module;
   a first communication path; and a bus communication path,
   wherein said first battery module includes
      a first battery cell group including one or a plurality of battery cells,
      a first state detector that detects an abnormal state or a normal state relating to charge and discharge of said first battery cell group, and generates a first detection signal representing the detected state, and
      a first CAN (Controller Area Network) communication circuit that sends the first detection signal generated by said first state detector to said bus communication path according to a CAN standard,
   said second battery module includes
      a second battery cell group including one or a plurality of battery cells,
      a second state detector that detects an abnormal state or a normal state relating to charge and discharge of said second battery cell group, and generates a second detection signal representing the detected state, and
      a second CAN communication circuit that sends the second detection signal generated by said second state detector to said bus communication path according to the CAN standard,
   said first communication path is provided to transmit said first detection signal generated by said first state detector to at least one of said second CAN communication circuit and said second state detector, and
   said bus communication path is provided to transmit said first detection signal sent by said first CAN communication circuit to an external object, while transmitting said second detection signal sent by said second CAN communication circuit to the external object.

2. The battery system according to claim 1, wherein said first communication path transmits the first detection signal generated by said first state detector to at least one of said second CAN communication circuit and said second state detector via said first CAN communication circuit.

3. The battery system according to claim 1, wherein said first communication path includes
   a second communication path that transmits the first detection signal generated by said first state detector to said first CAN communication circuit, and
   a third communication path that transmits the first detection signal generated by said first state detector to said second state detector.

4. The battery system according to claim 1, further comprising a second communication path that transmits said second detection signal generated by said second state detector to at least one of said first CAN communication circuit and said first state detector.

5. The battery system according to claim 4, wherein said second communication path transmits said second detection signal generated by said second state detector to at least one of said first CAN communication circuit and said first state detector via said second CAN communication circuit.

6. The battery system according to claim 4, wherein said second communication path includes
   a third communication path that transmits the second detection signal generated by said second state detector to said second CAN communication circuit, and
   a fourth communication path that transmits the second detection signal generated by said second state detector to said first state detector.

7. The battery system according to claim 1, further comprising a second communication path that transmits the second detection signal generated by said second state detector to the external object without passing through said first and second CAN communication circuits.

8. The battery system according to claim 1, comprising
   a single third battery module,
   a second communication path, and
   a single third communication path,
   wherein said single third battery module includes
      a third battery cell group including one or more battery cells,
      a third state detector that detects an abnormal state or a normal state relating to charge and discharge of said third battery cell group, and generates a third detection signal representing the detected state, and
      a third CAN communication circuit that sends said third detection signal generated by said third state detector to said bus communication path according to the CAN standard,
   said second communication path is provided to transmit said second detection signal generated by said second state detector in said second battery module to at least one of said third CAN communication circuit and said third state detector in said single third battery module,
   wherein said single third communication path transmits said third detection signal generated by said third state detector in said single third battery module to at least one of said first CAN communication circuit and said first state detector in said first battery module.

9. An electric vehicle comprising:
   the battery system according to claim 1;
   a motor that is driven with electric power of said battery system; and
   a driving wheel that rotates with a torque generated by said motor.

10. A movable body comprising:
    the battery system according to claim 1;
    a main body; and
    a power source that converts the electric power from said battery system into power for moving said main body.

11. A power storage device comprising:
    the battery system according to claim 1; and
    a system controller that performs control relating to discharge or charge of said first and second battery modules in said battery system.

12. A power supply device connectable to an external object, comprising:

the power storage device according to claim 11; and an electric power conversion device that is controlled by said system controller in said power storage device, and converts electric power between said battery system in said power storage device and said external object.

13. The battery system according to claim 1, comprising two or more third battery modules, a second communication path, and two or more third communication paths, wherein each of said two or more third battery modules includes a third battery cell group including one or more battery cells, a third state detector that detects an abnormal state or a normal state relating to charge and discharge of said third battery cell group, and generates a third detection signal representing the detected state, and a third CAN communication circuit that sends said third detection signal generated by said third state detector to said bus communication path according to the CAN standard, said second communication path is provided to transmit said second detection signal generated by said second state detector in said second battery module to at least one of said third CAN communication circuit and said third state detector in at least one of said two or more third battery modules, and one of said two or more third communication paths transmits said third detection signal generated by said third state detector in one of said two or more third battery modules to at least one of said first CAN communication circuit and said first state detector in said first battery module, and wherein each of the other two or more-third communication paths is provided to transmit said third detection signal generated by said third state detector in said two or more third battery modules to at least one of said third communication circuit and said third state detector the other two or more third battery modules.

* * * * *